(12) United States Patent
Moon

(10) Patent No.: US 12,713,372 B2
(45) Date of Patent: Aug. 18, 2026

(54) METHOD FOR TRANSMITTING DEVICE MANAGEMENT INFORMATION CONSIDERING IDLE MODE

(71) Applicant: SAMSUNG ELECTRONICS CO., LTD., Suwon-si (KR)

(72) Inventor: Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/569,493

(22) PCT Filed: Jun. 14, 2022

(86) PCT No.: PCT/KR2022/008337
§ 371 (c)(1),
(2) Date: Dec. 12, 2023

(87) PCT Pub. No.: WO2022/265332
PCT Pub. Date: Dec. 22, 2022

(65) Prior Publication Data

US 2024/0276411 A1 Aug. 15, 2024

(30) Foreign Application Priority Data

Jun. 18, 2021 (KR) ........................ 10-2021-0079340

(51) Int. Cl.
*H04W 56/00* (2009.01)
*H04M 15/00* (2006.01)
(Continued)

(52) U.S. Cl.
CPC ....... *H04W 56/0015* (2013.01); *H04M 15/66* (2013.01); *H04W 28/0268* (2013.01); *H04W 76/20* (2018.02)

(58) Field of Classification Search
None
See application file for complete search history.

(56) References Cited

U.S. PATENT DOCUMENTS 9,306,681 B2 4/2016 Malinen
11,324,014 B2 5/2022 Sampath et al.
(Continued)

FOREIGN PATENT DOCUMENTS

CN 112532503 A 3/2021
KR 10-2020-0100651 A 8/2020
(Continued)

OTHER PUBLICATIONS

Supplementary European Search Report dated Sep. 2, 2024, in connection with European Application No. 2285257.3, 8 pages.
(Continued)

*Primary Examiner* — Suhail Khan

(57) ABSTRACT

The present disclosure relates to a communication technique for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, security and safety related services, on the basis of 5G communication technologies and IoT-related technologies. Disclosed in the present invention is a method for providing time synchronization between wireless terminals to which a 5G system (5GS) is connected or is to be connected, by extending a function of supporting a time sensitive network (TSN) with a 3GPP 5GS.

14 Claims, 20 Drawing Sheets

(51) Int. Cl.

| | |
|---|---|
| ***H04W 28/02*** | (2009.01) |
| ***H04W 76/20*** | (2018.01) |

(56) References Cited

U.S. PATENT DOCUMENTS

| | | | | |
|---|---|---|---|---|
| 2017/0103440 | A1 | 4/2017 | Xing et al. | |
| 2019/0200365 | A1 | 6/2019 | Sampath et al. | |
| 2020/0329441 | A1 | 10/2020 | Ha et al. | |
| 2021/0058748 | A1 | 2/2021 | Liao | |
| 2021/0099341 | A1 | 4/2021 | Moon et al. | |
| 2021/0120627 | A1 | 4/2021 | Ayaz et al. | |
| 2022/0361120 | A1* | 11/2022 | Kim | H04W 56/001 |

FOREIGN PATENT DOCUMENTS

| | | | |
|---|---|---|---|
| KR | 10-2020-0104217 | A | 9/2020 |
| WO | 2021094236 | A1 | 5/2021 |

OTHER PUBLICATIONS

3GPP TS 23.501 V16.8.0 (Mar. 2021), Technical Specification, 3rd Generation Partnership Project; Technical Specification Group Services and System Aspects; System architecture for the 5G System (5GS); Stage 2 (Release 16), Mar. 2021, 451 pages.

3GPP TR 23.700-20 V1.3.0 (Nov. 2020), Technical Report, 3rd Generation Partnership Project; Technical Specification Group Services and System Aspects; Study on enhanced support of Industrial Internet of Things (IIoT) in the 5G System (5GS) (Release 17), Nov. 2020, 88 pages.

International Search Report and Written Opinion of the International Searching Authority dated Sep. 1, 2022, in connection with International Application No. PCT/KR2022/008337, 9 pages.

Huawei et al. "Procedures for 5GS Bridge information reporting and configuration", S2-1908619 (e-mail revision 2 of S2-1908565), 3GPP TSG WG SA2 Meeting #134. Sapporo, Japan. Jun. 24-28, 2019, 6 pages.

Communication pursuant to Article 94(3) EPC dated Dec. 16, 2025, in connection with European Application No. 22825257.3, 9 pages.

3GPP TS 29.512 V17.2.0 (Mar. 2021), Technical Specification, 3rd Generation Partnership Project; Technical Specification Group Core Network and Terminals; 5G System; Session Management Policy Control Service; Stage 3 (Release 17), Mar. 2021, 223 pages.

3GPP Ts 38.331 V16.4.1 (Mar. 2021), Technical Specification, 3rd Generation Partnership Project; Technical Specification Group Radio Access Network; NR; Radio Resource Control (RRC) protocol specification (Release 16), Mar. 2021, 949 pages.

* cited by examiner

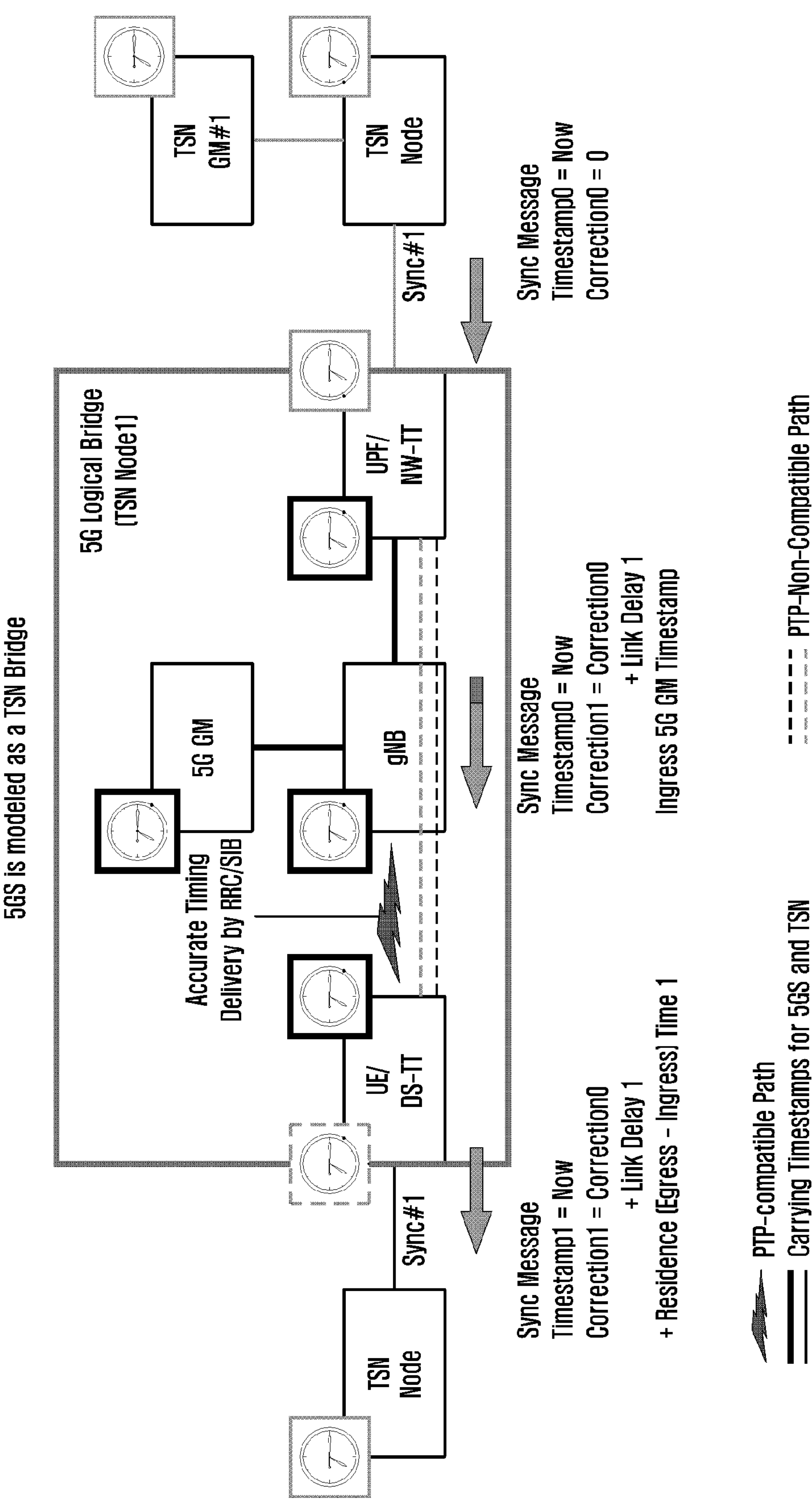
FIG. 3
5GS is modeled as a TSN Bridge
TSN GM#1
TSN Node
Sync#1
Sync Message
Timestamp0 = Now
Correction0 = 0
5G Logical Bridge (TSN Node1)
UPF/ NW-TT
5G GM
gNB
UE/ DS-TT
Accurate Timing Delivery by RRC/SIB
Sync Message
Timestamp0 = Now
Correction1 = Correction0
+ Link Delay 1
Ingress 5G GM Timestamp
TSN Node
Sync#1
Sync Message
Timestamp1 = Now
Correction1 = Correction0
+ Link Delay 1
+ Residence (Egress - Ingress) Time 1
PTP-compatible Path
Carrying Timestamps for 5GS and TSN
PTP-Non-Compatible Path

FIG. 4C

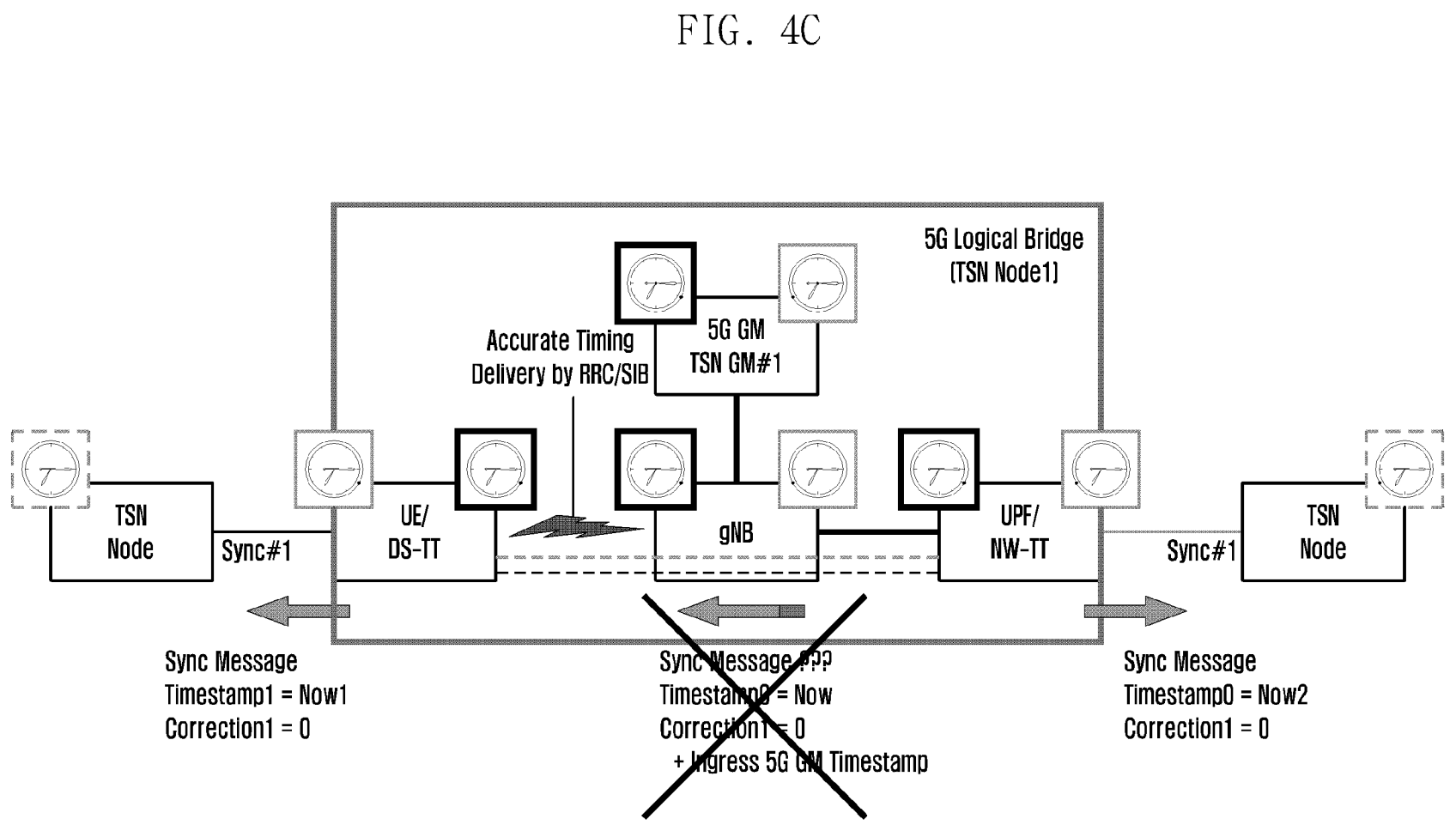

5G Logical Bridge (TSN Node1)

TSN Node

Sync#1

UE/ DS-TT

Accurate Timing Delivery by RRC/SIB

5G GM TSN GM#1 gNB

UPF/ NW-TT

TSN Node

Sync#1

Sync Message
Timestamp1 = Now1
Correction1 = 0

Sync Message ???
Timestamp0 = Now
Correction1 = 0
+ Ingress 5G GM Timestamp

Sync Message
Timestamp0 = Now2
Correction1 = 0

5GS Sync Exposure Configuration

FIG. 6

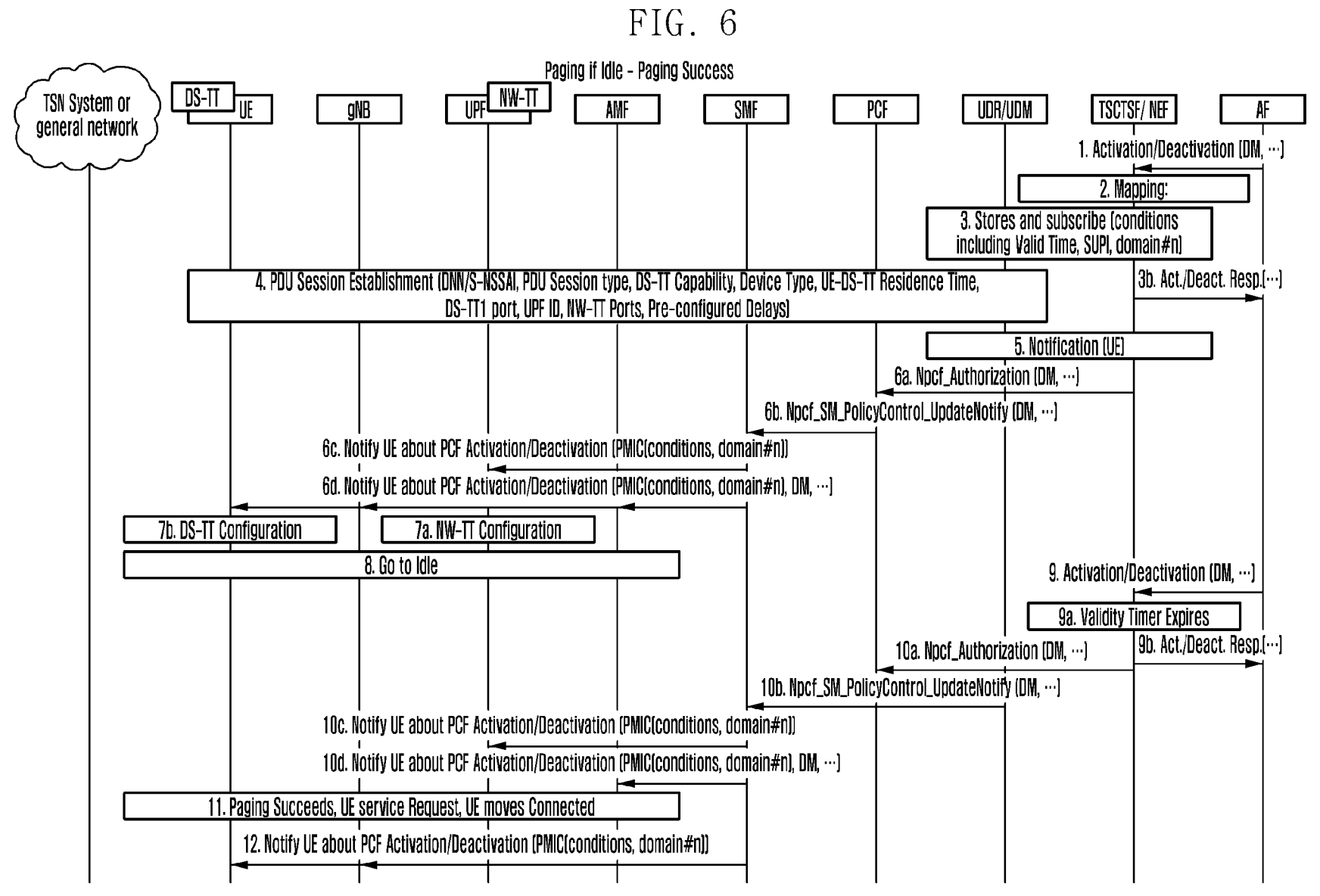

Paging if Idle - Paging Success

TSN System or general network
DS-TT
UE
gNB
UPF
NW-TT
AMF
SMF
PCF
UDR/UDM
TSCTSF/ NEF
AF 1. Activation/Deactivation (DM, ···)
2. Mapping:
3. Stores and subscribe (conditions including Valid Time, SUPI, domain#n)
3b. Act./Deact. Resp.(···)
4. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)
5. Notification (UE)
6a. Npcf_Authorization (DM, ···)
6b. Npcf_SM_PolicyControl_UpdateNotify (DM, ···)
6c. Notify UE about PCF Activation/Deactivation (PMIC(conditions, domain#n))
6d. Notify UE about PCF Activation/Deactivation (PMIC(conditions, domain#n), DM, ···)
7b. DS-TT Configuration
7a. NW-TT Configuration
8. Go to Idle
9. Activation/Deactivation (DM, ···)
9a. Validity Timer Expires
9b. Act./Deact. Resp.(···)
10a. Npcf_Authorization (DM, ···)
10b. Npcf_SM_PolicyControl_UpdateNotify (DM, ···)
10c. Notify UE about PCF Activation/Deactivation (PMIC(conditions, domain#n))
10d. Notify UE about PCF Activation/Deactivation (PMIC(conditions, domain#n), DM, ···)
11. Paging Succeeds, UE service Request, UE moves Connected
12. Notify UE about PCF Activation/Deactivation (PMIC(conditions, domain#n))

FIG. 7

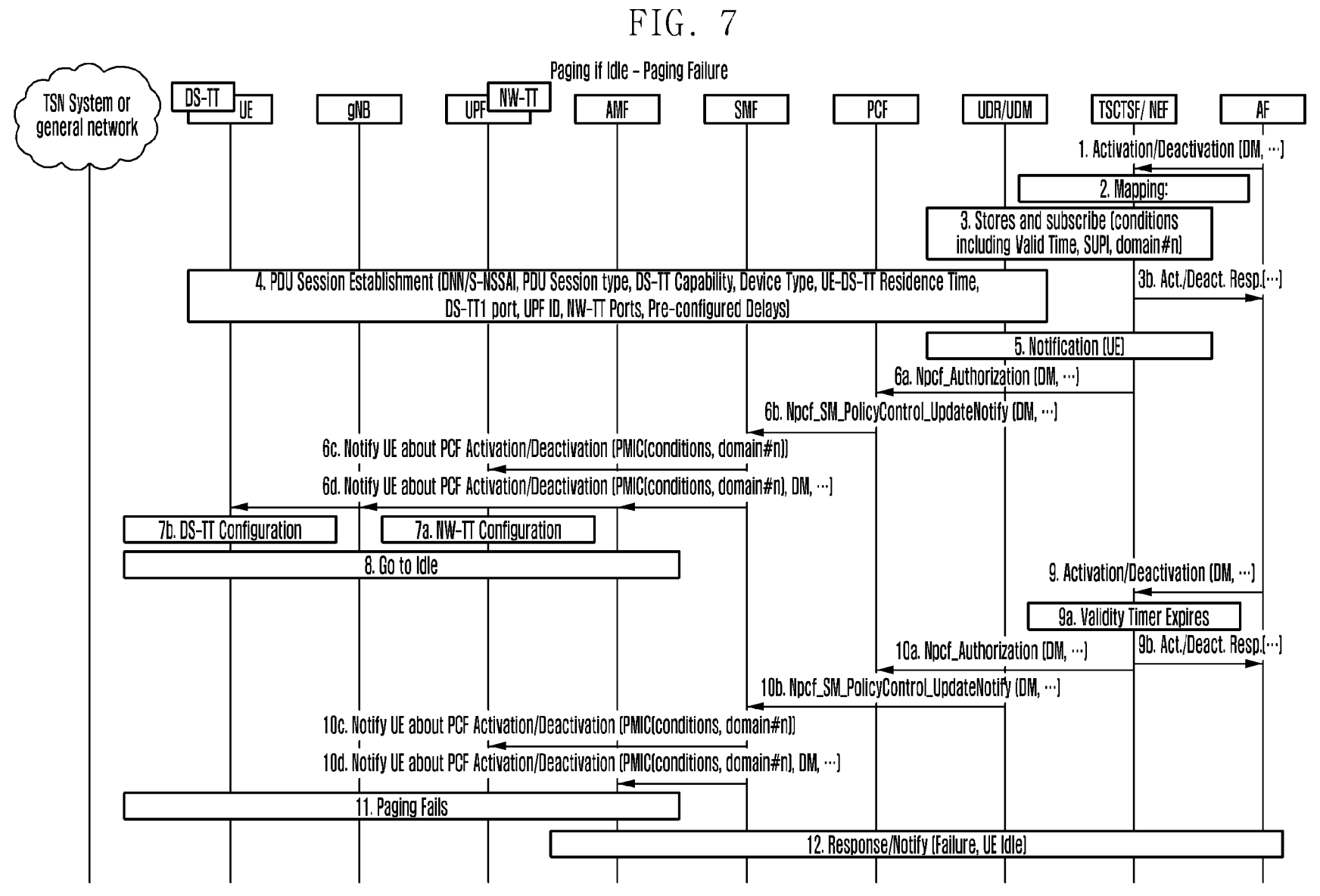

Paging if Idle - Paging Failure

TSN System or general network

DS-TT

UE gNB

UPF

NW-TT

AMF

SMF

PCF

UDR/UDM

TSCTSF/ NEF

AF

1. Activation/Deactivation (DM, ...)

2. Mapping:

3. Stores and subscribe (conditions including Valid Time, SUPI, domain#n)

3b. Act./Deact. Resp.(...)

4. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

5. Notification (UE)

6a. Npcf_Authorization (DM, ...)

6b. Npcf_SM_PolicyControl_UpdateNotify (DM, ...)

6c. Notify UE about PCF Activation/Deactivation (PMIC(conditions, domain#n))

6d. Notify UE about PCF Activation/Deactivation (PMIC(conditions, domain#n), DM, ...)

7a. NW-TT Configuration

7b. DS-TT Configuration

8. Go to Idle

9. Activation/Deactivation (DM, ...)

9a. Validity Timer Expires

9b. Act./Deact. Resp.(...)

10a. Npcf_Authorization (DM, ...)

10b. Npcf_SM_PolicyControl_UpdateNotify (DM, ...)

10c. Notify UE about PCF Activation/Deactivation (PMIC(conditions, domain#n))

10d. Notify UE about PCF Activation/Deactivation (PMIC(conditions, domain#n), DM, ...)

11. Paging Fails

12. Response/Notify (Failure, UE Idle)

FIG. 8

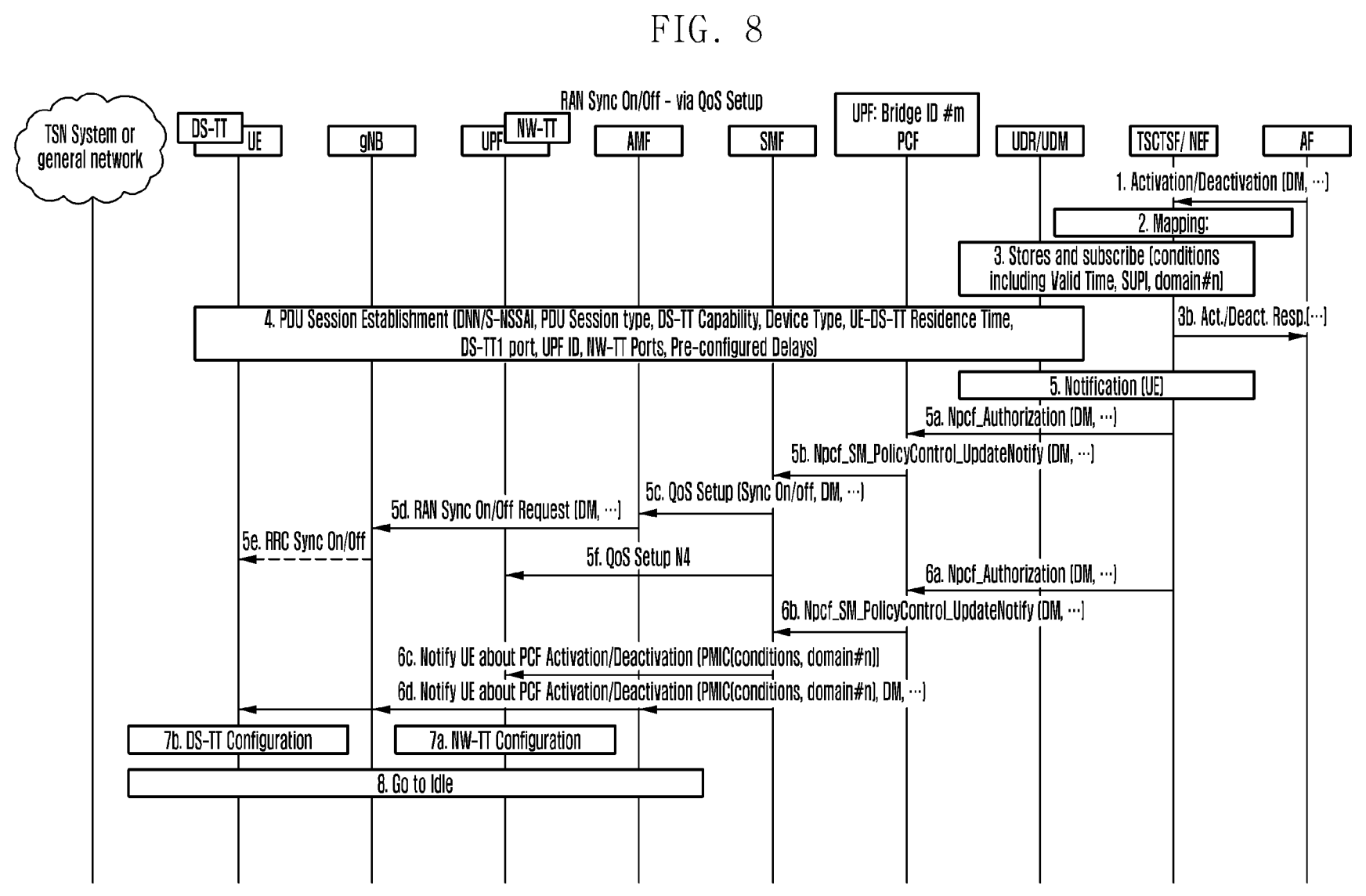

RAN Sync On/Off - via QoS Setup

TSN System or general network

DS-TT UE gNB

UPF NW-TT

AMF

SMF

UPF: Bridge ID #m PCF

UDR/UDM

TSCTSF/ NEF

AF

1. Activation/Deactivation (DM, ...)

2. Mapping;

3. Stores and subscribe (conditions including Valid Time, SUPI, domain#n)

3b. Act./Deact. Resp.(...)

4. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

5. Notification (UE)

5a. Npcf_Authorization (DM, ...)

5b. Npcf_SM_PolicyControl_UpdateNotify (DM, ...)

5c. QoS Setup (Sync On/off, DM, ...)

5d. RAN Sync On/Off Request (DM, ...)

5e. RRC Sync On/Off

5f. QoS Setup N4

6a. Npcf_Authorization (DM, ...)

6b. Npcf_SM_PolicyControl_UpdateNotify (DM, ...)

6c. Notify UE about PCF Activation/Deactivation (PMIC(conditions, domain#n))

6d. Notify UE about PCF Activation/Deactivation (PMIC(conditions, domain#n), DM, ...)

7b. DS-TT Configuration

7a. NW-TT Configuration

8. Go to Idle

Figure 10:
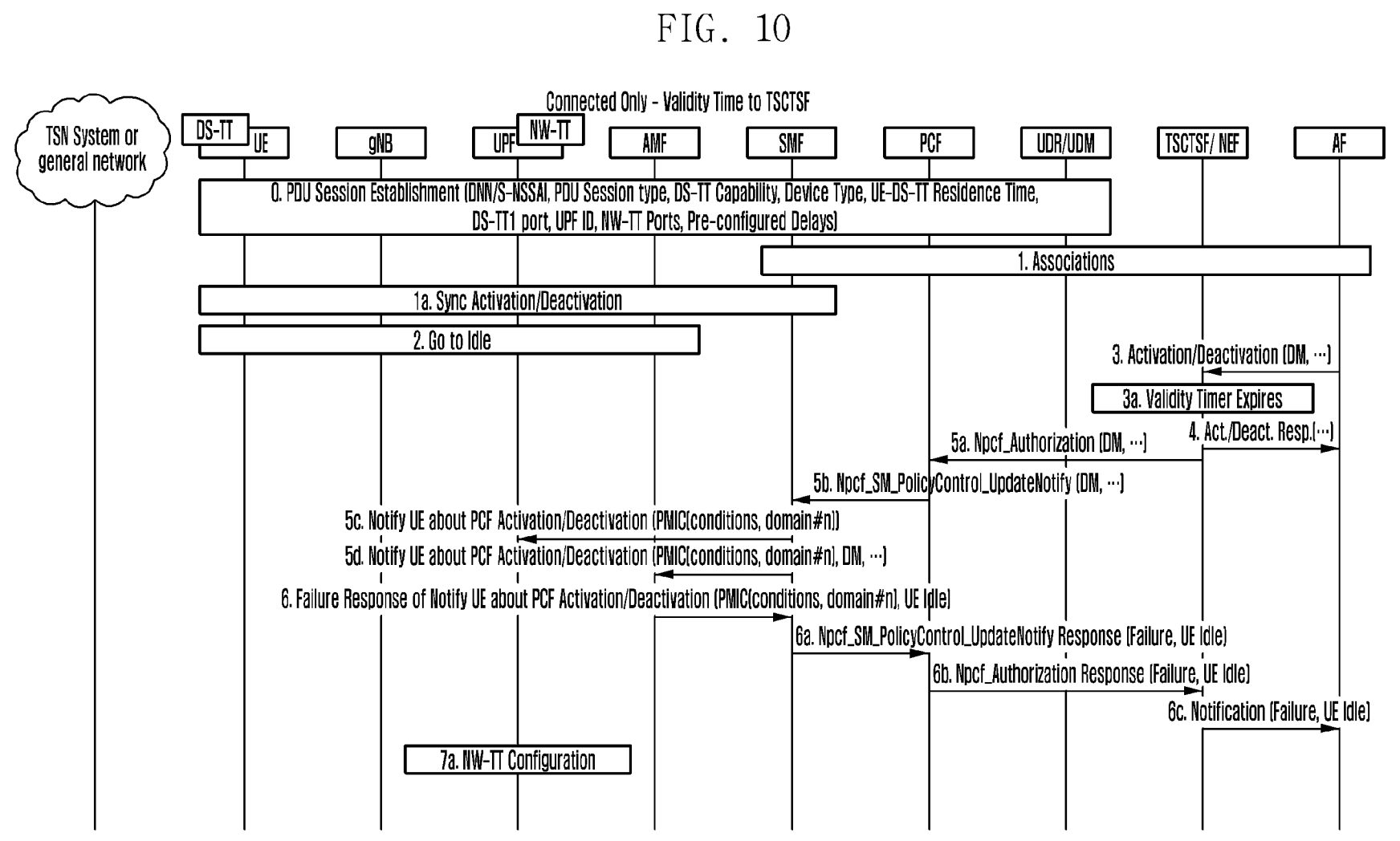

Connected Only - Validity Time to TSCTSF

TSN System or general network

DS-TT

UE gNB

UPF

NW-TT

AMF

SMF

PCF

UDR/UDM

TSCTSF/ NEF

AF

0. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

1. Associations

1a. Sync Activation/Deactivation

2. Go to Idle

3. Activation/Deactivation (DM, ...)

3a. Validity Timer Expires

4. Act./Deact. Resp.(...)

5a. Npcf_Authorization (DM, ...)

5b. Npcf_SM_PolicyControl_UpdateNotify (DM, ...)

5c. Notify UE about PCF Activation/Deactivation (PMIC(conditions, domain#n))

5d. Notify UE about PCF Activation/Deactivation (PMIC(conditions, domain#n), DM, ...)

6. Failure Response of Notify UE about PCF Activation/Deactivation (PMIC(conditions, domain#n), UE Idle)

6a. Npcf_SM_PolicyControl_UpdateNotify Response (Failure, UE Idle)

6b. Npcf_Authorization Response (Failure, UE Idle)

6c. Notification (Failure, UE Idle)

7a. NW-TT Configuration

Figure 12:
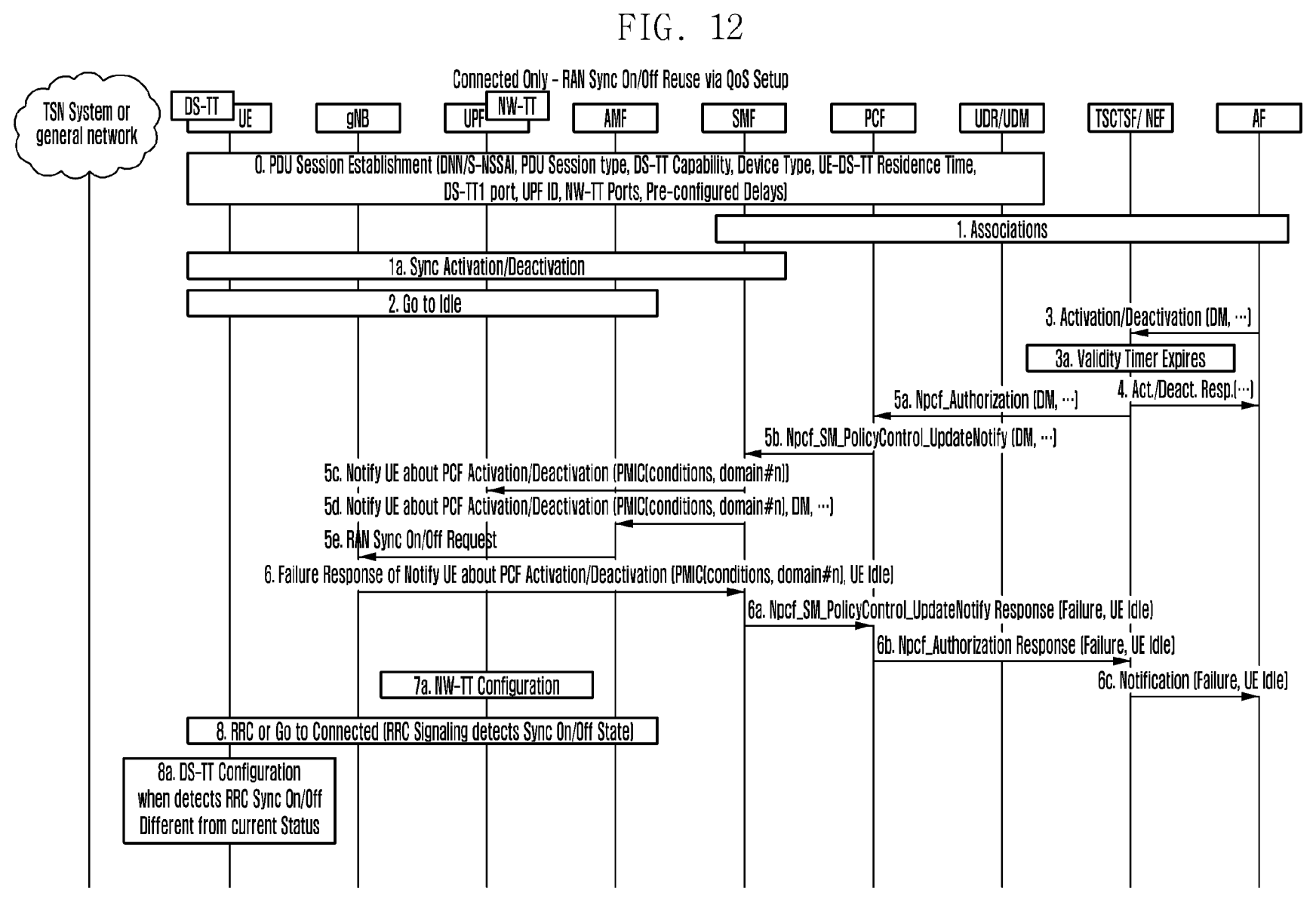

Connected Only - RAN Sync On/Off Reuse via QoS Setup

TSN System or general network

DS-TT

UE gNB

UPF

NW-TT

AMF

SMF

PCF

UDR/UDM

TSCTSF/ NEF

AF

0. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

1. Associations

1a. Sync Activation/Deactivation

2. Go to Idle

3. Activation/Deactivation (DM, …)

3a. Validity Timer Expires

4. Act./Deact. Resp.(…)

5a. Npcf_Authorization (DM, …)

5b. Npcf_SM_PolicyControl_UpdateNotify (DM, …)

5c. Notify UE about PCF Activation/Deactivation (PMIC(conditions, domain#n))

5d. Notify UE about PCF Activation/Deactivation (PMIC(conditions, domain#n), DM, …)

5e. RAN Sync On/Off Request

6. Failure Response of Notify UE about PCF Activation/Deactivation (PMIC(conditions, domain#n), UE Idle)

6a. Npcf_SM_PolicyControl_UpdateNotify Response (Failure, UE Idle)

6b. Npcf_Authorization Response (Failure, UE Idle)

6c. Notification (Failure, UE Idle)

7a. NW-TT Configuration

8. RRC or Go to Connected (RRC Signaling detects Sync On/Off State)

8a. DS-TT Configuration when detects RRC Sync On/Off Different from current Status

FIG. 13

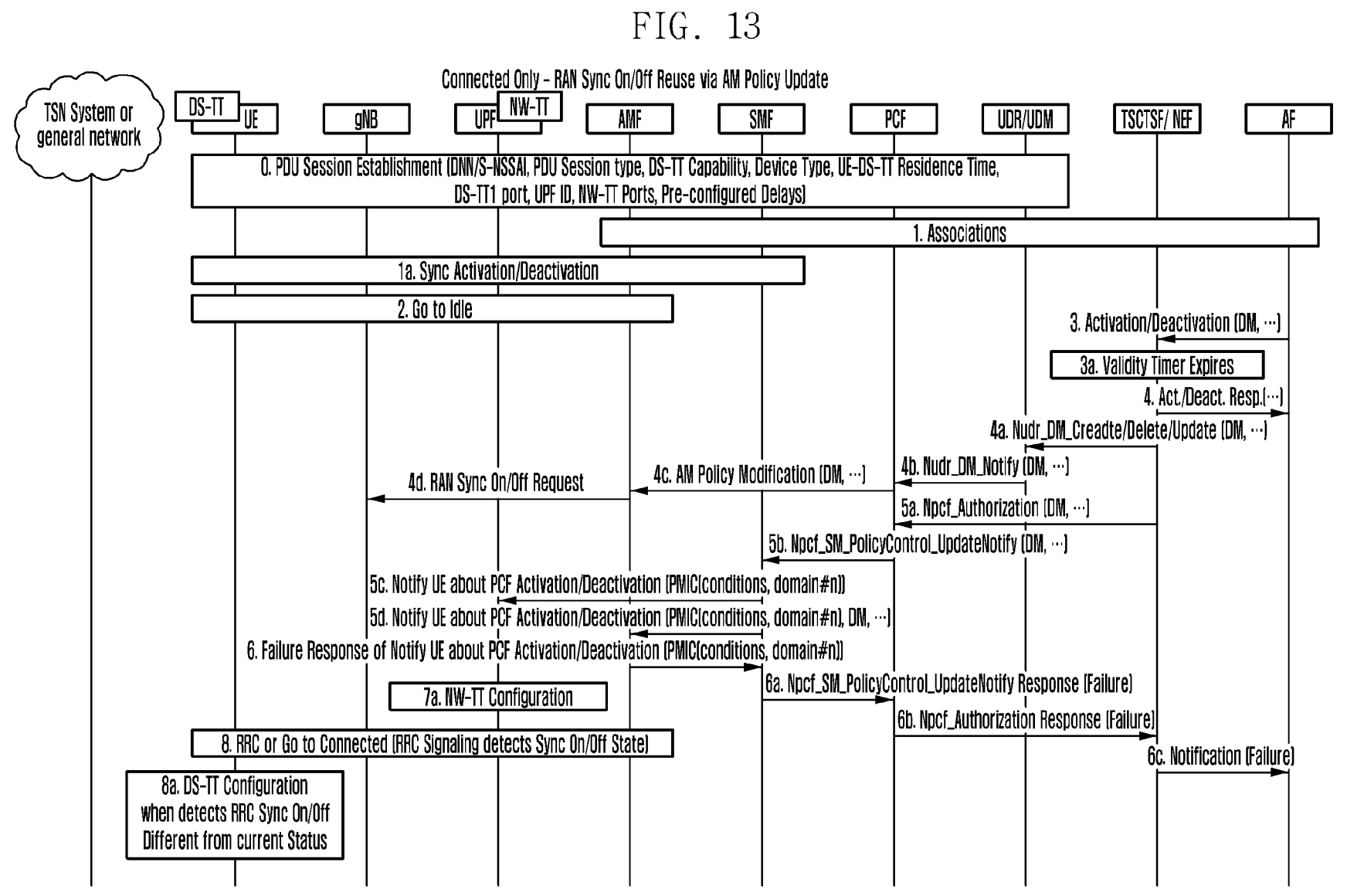

Connected Only – RAN Sync On/Off Reuse via AM Policy Update

TSN System or general network

DS-TT

UE gNB

UPF

NW-TT

AMF

SMF

PCF

UDR/UDM

TSCTSF/ NEF

AF

0. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

1. Associations

1a. Sync Activation/Deactivation

2. Go to Idle

3. Activation/Deactivation (DM, …)

3a. Validity Timer Expires

4. Act./Deact. Resp.(…)

4. Act./Deact./Delete/Update (DM, …)

4a. Nudr_DM_Creadte/Delete/Update (DM, …)

4b. Nudr_DM_Notify (DM, …)

4c. AM Policy Modification (DM, …)

4d. RAN Sync On/Off Request

5a. Npcf_Authorization (DM, …)

5b. Npcf_SM_PolicyControl_UpdateNotify (DM, …)

5c. Notify UE about PCF Activation/Deactivation (PMIC(conditions, domain#n))

5d. Notify UE about PCF Activation/Deactivation (PMIC(conditions, domain#n), DM, …)

6. Failure Response of Notify UE about PCF Activation/Deactivation (PMIC(conditions, domain#n))

6a. Npcf_SM_PolicyControl_UpdateNotify Response (Failure)

6b. Npcf_Authorization Response (Failure)

6c. Notification (Failure)

7a. NW-TT Configuration

8. RRC or Go to Connected (RRC Signaling detects Sync On/Off State)

8a. DS-TT Configuration when detects RRC Sync On/Off Different from current Status

Figure 15:
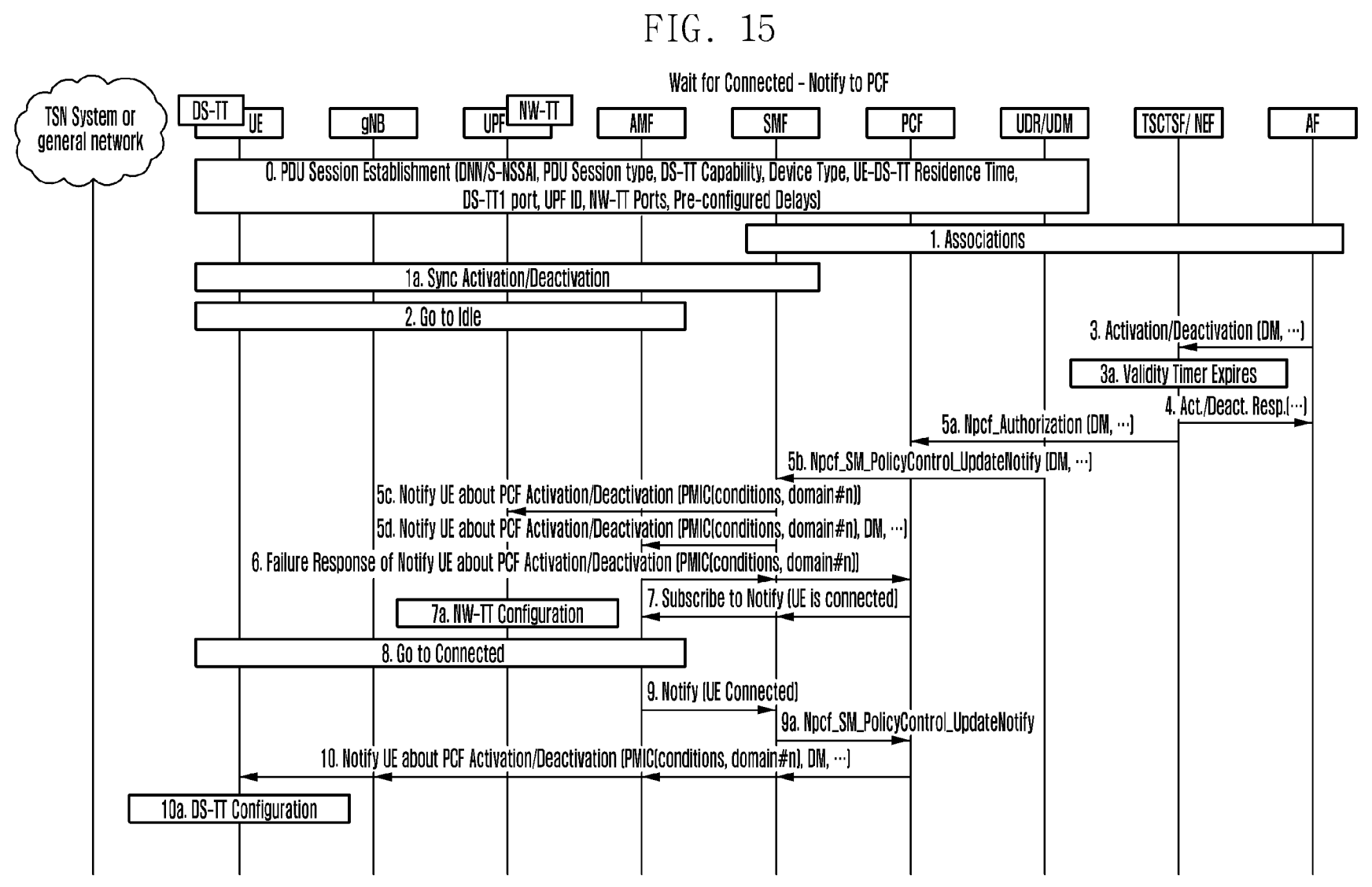

Wait for Connected - Notify to PCF

TSN System or general network
DS-TT
UE
gNB
UPF
NW-TT
AMF
SMF
PCF
UDR/UDM
TSCTSF/ NEF
AF 0. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)

1. Associations

1a. Sync Activation/Deactivation

2. Go to Idle

3. Activation/Deactivation (DM, ···)

3a. Validity Timer Expires

4. Act./Deact. Resp.(···)

5a. Npcf_Authorization (DM, ···)

5b. Npcf_SM_PolicyControl_UpdateNotify (DM, ···)

5c. Notify UE about PCF Activation/Deactivation (PMIC(conditions, domain#n))

5d. Notify UE about PCF Activation/Deactivation (PMIC(conditions, domain#n), DM, ···)

6. Failure Response of Notify UE about PCF Activation/Deactivation (PMIC(conditions, domain#n))

7. Subscribe to Notify (UE is connected)

7a. NW-TT Configuration

8. Go to Connected

9. Notify (UE Connected)

9a. Npcf_SM_PolicyControl_UpdateNotify

10. Notify UE about PCF Activation/Deactivation (PMIC(conditions, domain#n), DM, ···)

10a. DS-TT Configuration

Figure 17:
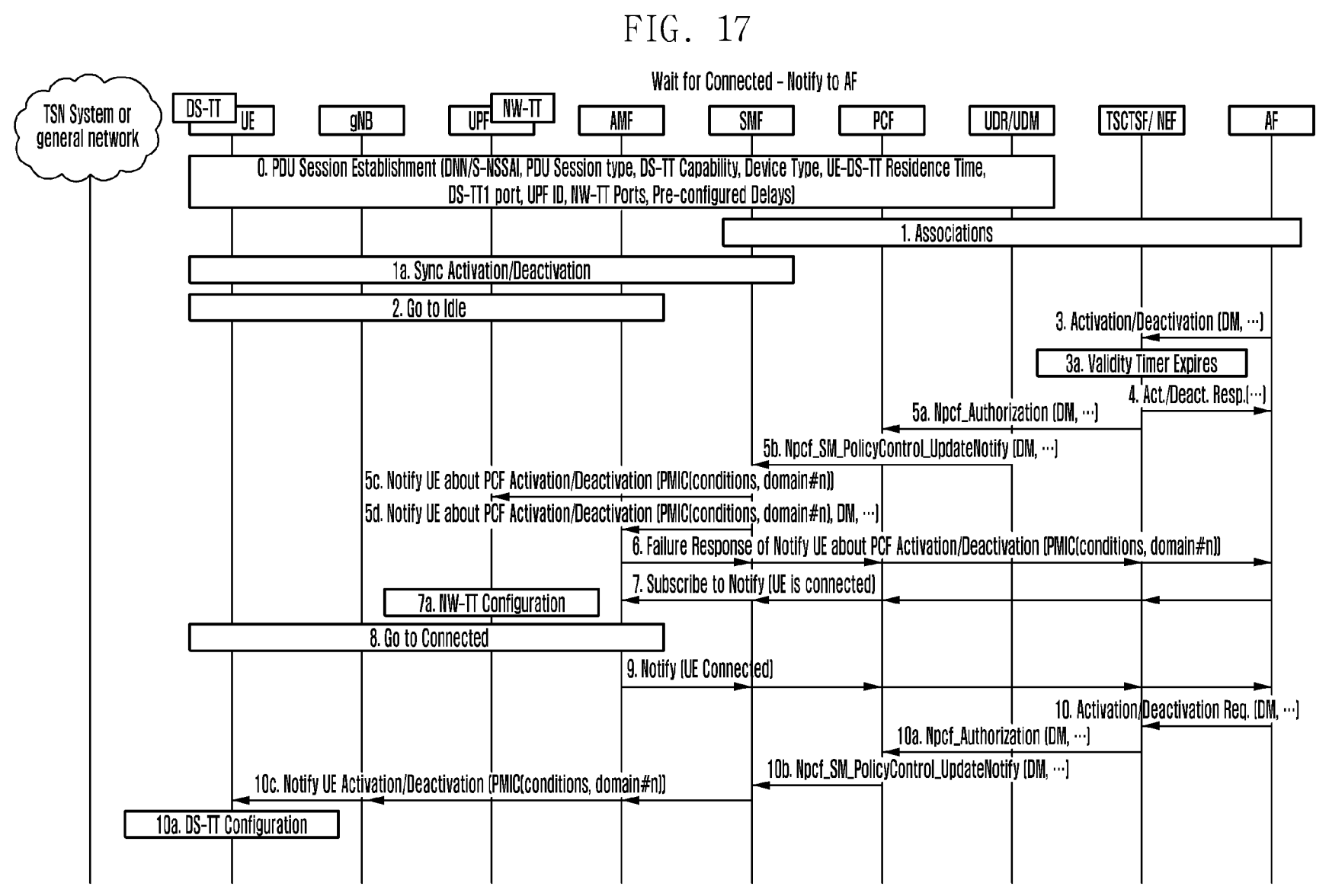

Wait for Connected - Notify to AF

TSN System or general network
DS-TT
UE
gNB
UPF
NW-TT
AMF
SMF
PCF
UDR/UDM
TSCTSF/ NEF
AF 0. PDU Session Establishment (DNN/S-NSSAI, PDU Session type, DS-TT Capability, Device Type, UE-DS-TT Residence Time, DS-TT1 port, UPF ID, NW-TT Ports, Pre-configured Delays)
1. Associations
1a. Sync Activation/Deactivation
2. Go to Idle
3. Activation/Deactivation (DM, ...)
3a. Validity Timer Expires
4. Act./Deact. Resp.(...)
5a. Npcf_Authorization (DM, ...)
5b. Npcf_SM_PolicyControl_UpdateNotify (DM, ...)
5c. Notify UE about PCF Activation/Deactivation (PMIC(conditions, domain#n))
5d. Notify UE about PCF Activation/Deactivation (PMIC(conditions, domain#n), DM, ...)
6. Failure Response of Notify UE about PCF Activation/Deactivation (PMIC(conditions, domain#n))
7. Subscribe to Notify (UE is connected)
7a. NW-TT Configuration
8. Go to Connected
9. Notify (UE Connected)
10. Activation/Deactivation Req. (DM, ...)
10a. Npcf_Authorization (DM, ...)
10b. Npcf_SM_PolicyControl_UpdateNotify (DM, ...)
10c. Notify UE Activation/Deactivation (PMIC(conditions, domain#n))
10a. DS-TT Configuration

METHOD FOR TRANSMITTING DEVICE MANAGEMENT INFORMATION CONSIDERING IDLE MODE

TECHNICAL FIELD

The disclosure relates to a wireless communication network, and more specifically, to a method for providing time synchronization between wireless UEs to which a 5G system (5GS) is connected or is to be connected, by extending a function of supporting a time sensitive network (TSN) with a 3GPP 5GS.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on technologies of evolved small cells, advanced small cells, cloud radio access networks (cloud RANs), ultra-dense networks, device-to-device (D2D) communication, wireless backhaul, moving network, cooperative communication, coordinated multi-points (COMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet is evolving from a human-centered connection network where humans generate and consume information to an Internet of Things (IoT) network that exchanges and processes information between distributed components such as things. The Internet of everything (IoE) technology, which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently being studied. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

DISCLOSURE OF INVENTION

Technical Problem

In case that a 3GPP network (5GS) becomes a synchronization source, and an NW-TT or a DS-TT generates and delivers a (g)PTP message to an external wireless node, it is required to determine whether to deliver the (g)PTP message even to an inside of the 3GPP network (5GS) and how to deliver a request thereto. It may be possible to provide visual synchronization just by delivering a 5GS synchronization time reference without delivering the (g)PTP message. As described above, since it may be requested from an outside whether the 5GS provides a visual synchronization function, and if so, how the 5GS provides the visual synchronization function, and in accordance with this request, the 5GS delivers management information required inside the 5GS, it should be resolved whether to deliver the management information to an idle mode UE, and if so, how to deliver the management information.

Solution to Problem

In order to solve the above problems, a method performed by a time sensitive communication and time synchronization function (TSCTSF) in a communication system according to an embodiment of the disclosure may include: receiving, from an application function (AF), a synchronization activation command; generating management information based on the synchronization activation command, the management information including first management information associated with a network side-translator (NS-TT) configuration of a user plane function (UPF) and second management information associated with a device side-translator (DS-TT) configuration of a terminal; and delivering, via a policy control function (PCF), the first management information to a session management function (SMF) and the second management information to an access and mobility management function (AMF), wherein the second management information includes information indicating a time-based on/off for an idle-state terminal, and wherein the information indicating the time-based on/off is broadcasted through system information of a base station.

Further, a method performed by an access and mobility management function (AMF) in a communication system according to an embodiment of the disclosure may include: receiving, from a time sensitive communication and time synchronization function (TSCTSF), management information associated with a device side-translator (DS-TT) configuration of a terminal; identifying information indicating a time-based on/off for an idle-state terminal included in the management information; and transmitting, to a base station, the information indicating the time-based on/off, wherein the information indicating the time-based on/off is broadcasted through system information.

Further, a method performed by a terminal in a communication system according to an embodiment of the disclosure may include: receiving system information in an idle state; identifying information indicating a time-based on/off included in the system information; and performing a synchronization operation based on the information indicating the time-based on/off, wherein management information associated with a device side-translator (DS-TT) configuration of the terminal is transmitted from a time sensitive communication and time synchronization function (TSCTSF) to an access and mobility management function (AMF), and wherein the management information includes the information indicating the time-based on/off for the UE in the idle state.

Further, a time sensitive communication and time synchronization function (TSCTSF) in a communication system according to an embodiment of the disclosure may include: a communication unit; and a controller configured to: control the communication unit to receive, from an application function (AF), a synchronization activation command, generate management information based on the synchronization activation command, the management information including first management information associated with a network side-translator (NS-TT) configuration of a user plane function (UPF) and second management information associated with a device side-translator (DS-TT) configuration of a terminal, and control the communication unit to deliver, via a policy control function (PCF), the first management information to a session management function (SMF) and the second management information to an access and mobility management function (AMF), wherein the second management information includes information indicating a time-based on/off for an idle-state terminal, and wherein the information indicating the time-based on/off is broadcasted through system information of a base station.

Further, an access and mobility management function (AMF) in a communication system according to an embodiment of the disclosure may include: a communication unit; and a controller configured to: control the communication unit to receive, from a time sensitive communication and time synchronization function (TSCTSF), management information associated with a device side-translator (DS-TT) configuration of a terminal, identify information indicating a time-based on/off for an idle-state terminal included in the management information, and control the communication unit to transmit, to a base station, the information indicating the time-based on/off, wherein the information indicating the time-based on/off is broadcasted through system information.

Further, a terminal in a communication system according to an embodiment of the disclosure may include: a communication unit; and a controller configured to: control the communication unit to receive system information in an idle state, identify information indicating a time-based on/off included in the system information, and control to perform a synchronization operation based on the information indicating the time-based on/off, wherein management information associated with a device side-translator (DS-TT) configuration of the terminal is transmitted from a time sensitive communication and time synchronization function (TSCTSF) to an access and mobility management function (AMF), and wherein the management information includes the information indicating the time-based on/off for the UE in the idle state.

Advantageous Effects of Invention

The existing method unconditionally attempts delivery of the management information even to the idle-mode UE, and for this, makes the UE be switched to a connected mode by performing paging for the UE, and then delivers the management information to the UE by using a non-access stratum (NAS) message. Since the paging is performed by using a common channel, RAN resources are used and a delay time occurs until the UE is switched to the connected mode, and in some cases, the above operation may be repeated several times. Accordingly, waste of radio resources occurs, and the delay time during the delivery occurs.

If information that is not required to be delivered to the idle-mode UE is not delivered in the idle mode, the waste of the radio resources can be prevented. By waiting for the UE's switchover to the connected mode in another method without using paging with respect to the message with an ample delay time, it is also possible to save the radio resources. By only giving up the delivery to the idle-mode UE with respect to the message that is enough to be only delivered to the connected-mode UE from the beginning, the management information delivery result can be immediately fed back, and thus the delay time can be rather shortened.

BRIEF DESCRIPTION OF DRAWINGS

FIG. 3 illustrates a method in which a 5G network supports TSN time synchronization.

FIG. 4C illustrates a method in which UEs can generate and provide a sync message to outside based on a 5GS clock with 5G UE/DS-TT, and VIAPA support examples using the method.

FIG. 6 illustrates a method for delivering management information to an idle-mode UE by using paging.

FIG. 7 explains addition of a notification procedure during paging failure in a method for delivering management information to an idle-mode UE by using paging.

FIG. 8 explains addition of a procedure in which 5GCN delivers a 5G timing reference control to RAN by using a QoS configuration process to a method for delivering management information.

FIG. 9 explains addition of a procedure in which 5GCN delivers a 5G timing reference control to RAN by using an AM policy configuration process to a method for delivering management information.

FIG. 10 illustrates a method in which TSCTSF/NEF delivers management information only to a connected-mode UE while managing a validity time.

FIG. 11 illustrates a method in which UE/DS-TT delivers management information only to a connected-mode UE while managing a validity time.

FIG. 12 illustrates a method in which CN delivers management information only to a connected-mode UE in case that the CN delivers a 5GS reference time control to RAN by using a QoS configuration process.

FIG. 13 illustrates a method in which CN delivers management information only to a connected-mode UE in case that the CN delivers a 5GS reference time control to RAN by using an AM policy configuration process.

FIG. 14 illustrates a method in which SMF delivers management information after waiting for an idle-mode UE to move to a connected mode.

FIG. 15 illustrates a method in which PCF delivers management information after waiting for an idle-mode UE to move to a connected mode.

FIG. 16 illustrates a method in which TSCTSF/NEF delivers management information after waiting for an idle-mode UE to move to a connected mode.

FIG. 17 illustrates a method in which AF delivers management information after waiting for an idle-mode UE to move to a connected mode.

MODE FOR THE INVENTION

Hereinafter, the operation principle of the disclosure will be described in detail with reference to the accompanying drawings. In describing the disclosure hereinafter, detailed explanation of related known functions or configurations will be omitted if it is determined that it obscures the gist of the disclosure in unnecessary detail. Further, terms to be described later are terms defined in consideration of their functions in the disclosure, but may differ depending on intentions of a user or an operator, or customs. Accordingly, they should be defined on the basis of the contents of the whole description of the disclosure.

In the following description, a term to identify an access node, a term to denote a network entity, a term to denote messages, a term to denote an interface between network entities, and a term to denote a variety of types of identity information have been exemplified for convenience in explanation. Accordingly, the disclosure is not limited to the terms to be described later, and other terms to denote targets having equivalent technical meanings may be used.

For convenience in explanation, in the disclosure, terms and names defined in 5GS and NR standards that are the latest standards defined in the 3rd Generation Partnership Project (3GPP) groups among the currently existing communication standards are used. However, the disclosure is not restricted by the terms and names, and it may be equally applied to wireless communication networks complying with other standards. In particular, the disclosure may be applied to the 3GPP 5GS/NR (5th generation mobile communication standards).

In order to support a scenario, such as factory automation, time synchronization of related nodes is necessary. In particular, in a situation where a precision work is required, the precision of the time synchronization should be high. In case of utilizing Ethernet for industrial use, time sensitive networking (TSN) technology that is a method for supporting time synchronization among nodes connected on Ethernet has been researched and commercialized to be used.

Figure 1:
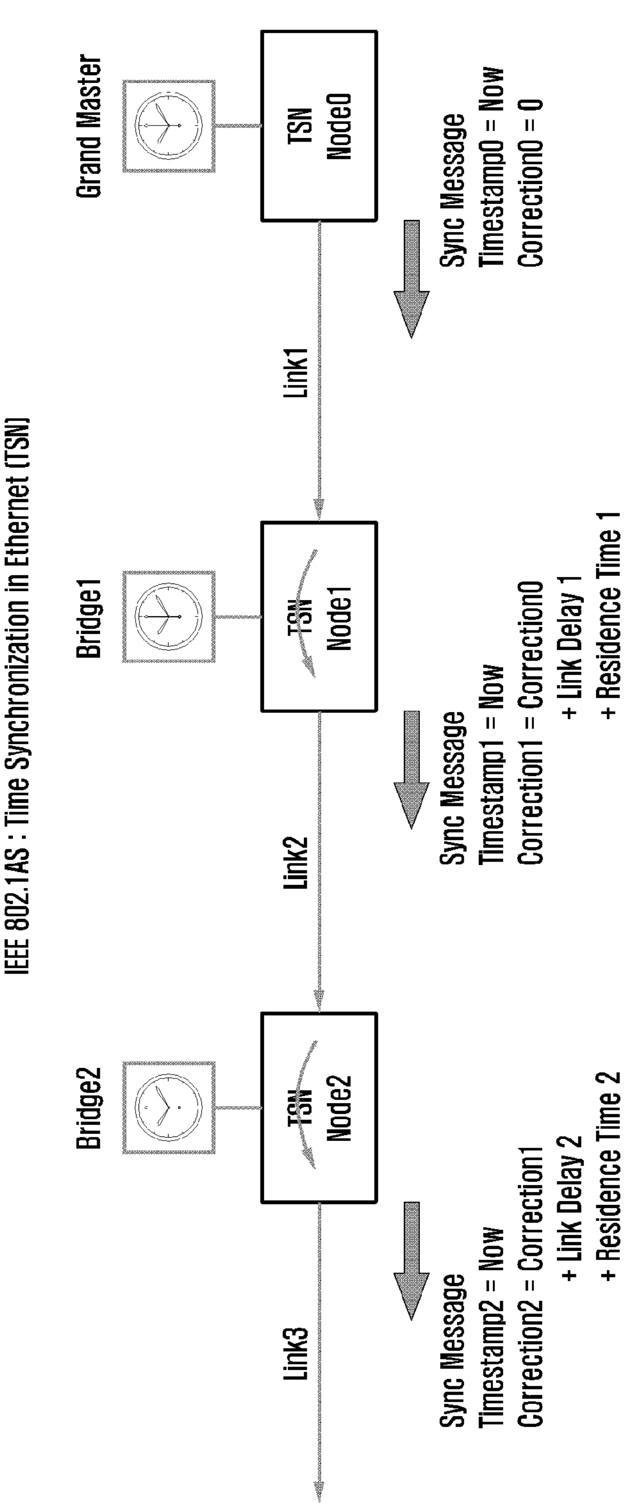
FIG. 1 explains the time synchronization principle on Ethernet of TSN.

FIG. 1 explains the time synchronization principle on Ethernet of TSN that is the existing technology. The TSN nodes determine a grand master (GM) that becomes their criterion, and TSN Node0 connected thereto generates a sync frame by putting the current time of the GM in a timestamp field and filling a correction field with 0, and transmits the sync frame to the next node. TSN Node1 that is the next node receives the sync frame having gone through Link Delay 1, updates a correction field even in consideration of Residence Time1 that is the time spent at its own node, and transmits the sync frame to the next node. TSN Node2 that is the next node receives the sync frame having gone through Link Delay 2, updates a correction field even in consideration of Residence Time2 that is the time spent at its own node, and transmits the sync frame to the next node. Each node manages latency for a link to the previous node through periodic measurement and average calculation of the latency. Further, each node should have a method for calculating the residence time at its own node.

Figure 2:
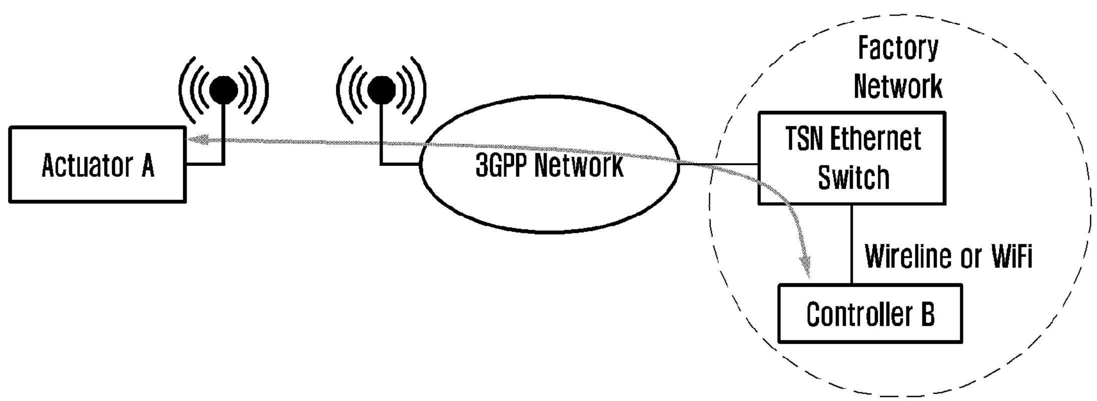
FIG. 2 illustrates a TSN time synchronization support scenario of a 5G network.

FIG. 2 illustrates a factory automation scenario supporting mobility by applying a 5G network, and in this case, the 5G network should support the TSN.

FIG. 3 illustrates a method in which a 5G network supports TSN time synchronization as the existing technology. This method is for the 5G network to support the TSN in a situation such as in FIG. 2, and in this method, the 5G network is modeled with one TSN bridge (TSN node) of FIG. 1. That is, as one TSN node, a user plane function (UPF)-gNB-user equipment (UE) that is the 5G network supports the TSN by updating a sync frame through correction of a link delay and a residence time. For this, it is assumed that the UPF, gNB, and UE inside the 5G network are synchronized with a common 5G GM. For example, the gNB may be connected to a global positioning system (GPS), the UPF may be connected to the gNB through the Ethernet-based TSN and may be synchronized with the gNB, and the UE may be synchronized with the gNB through a process of sending and receiving PHY frames. The UPF may be connected to a TSN node of a wired network, and the UE may also be connected to a TSN node of the wired network.

Since FIG. 3 shows a situation where a GM of the TSN is present in the TSN node connected to the UPF, the UPF receives the sync frame from the previous TSN node. The UPF records the time based on the 5G GM of the received sync frame as an ingress time. The UPF periodically calculates and manages the link delay with the previous TSN node. The UPF delivers the sync frame including the ingress time and the link delay to the UE. The UE calculates the residence time that is the spent time in the 5G network based on the time based on the 5G GM at the moment of transmitting the sync frame toward the next TSN node. The UE transmits the sync frame to the next TSN node by updating a correction field by using the residence time and the link delay.

FIGS. 4A, 4B, 4C, and 4D illustrate a method in which UEs can generate and provide a sync message to outside based on a 5GS clock with 5G UE/device-side translator (DS-TT), and VIAPA support examples using the method.

Figure 4A:
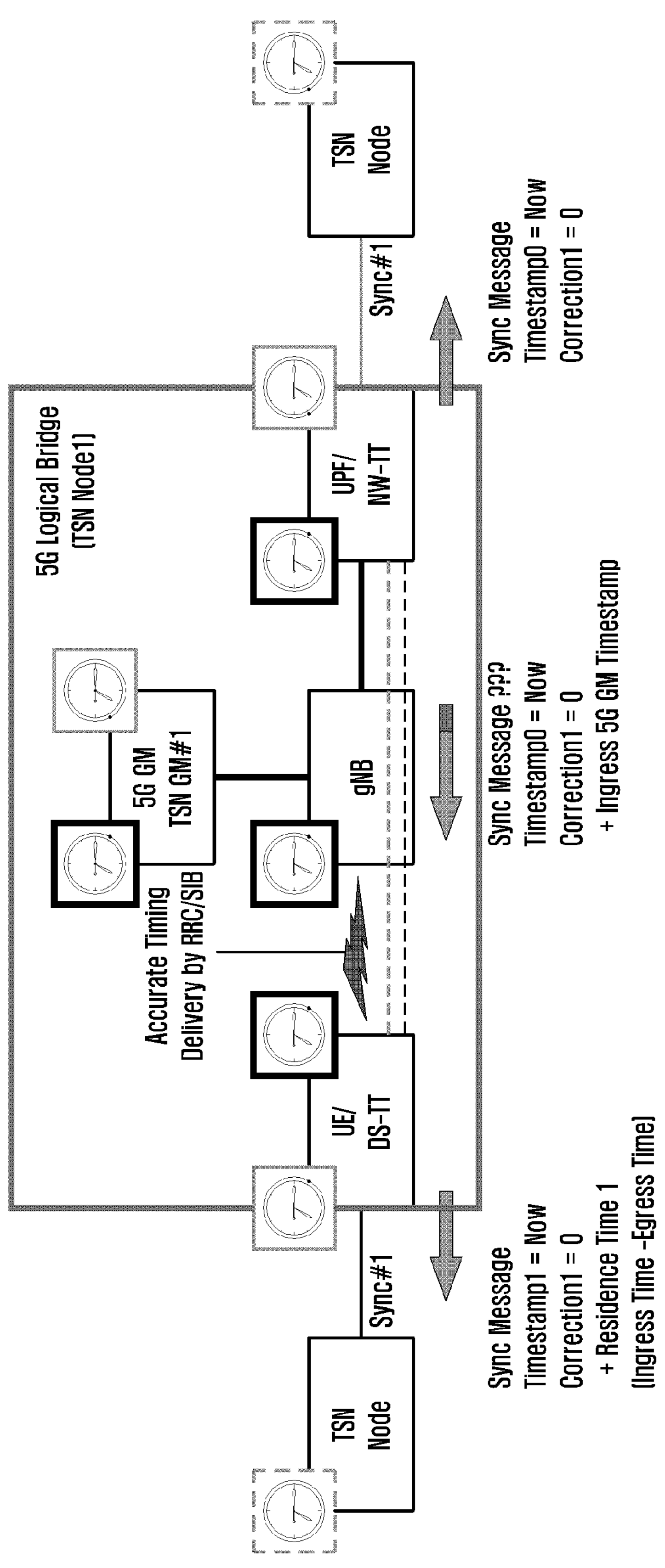
FIG. 4A illustrates a method in which UEs can generate and provide a sync message to outside based on a 5GS clock with 5G UE/DS-TT, and VIAPA support examples using the method.
Figure 4B:
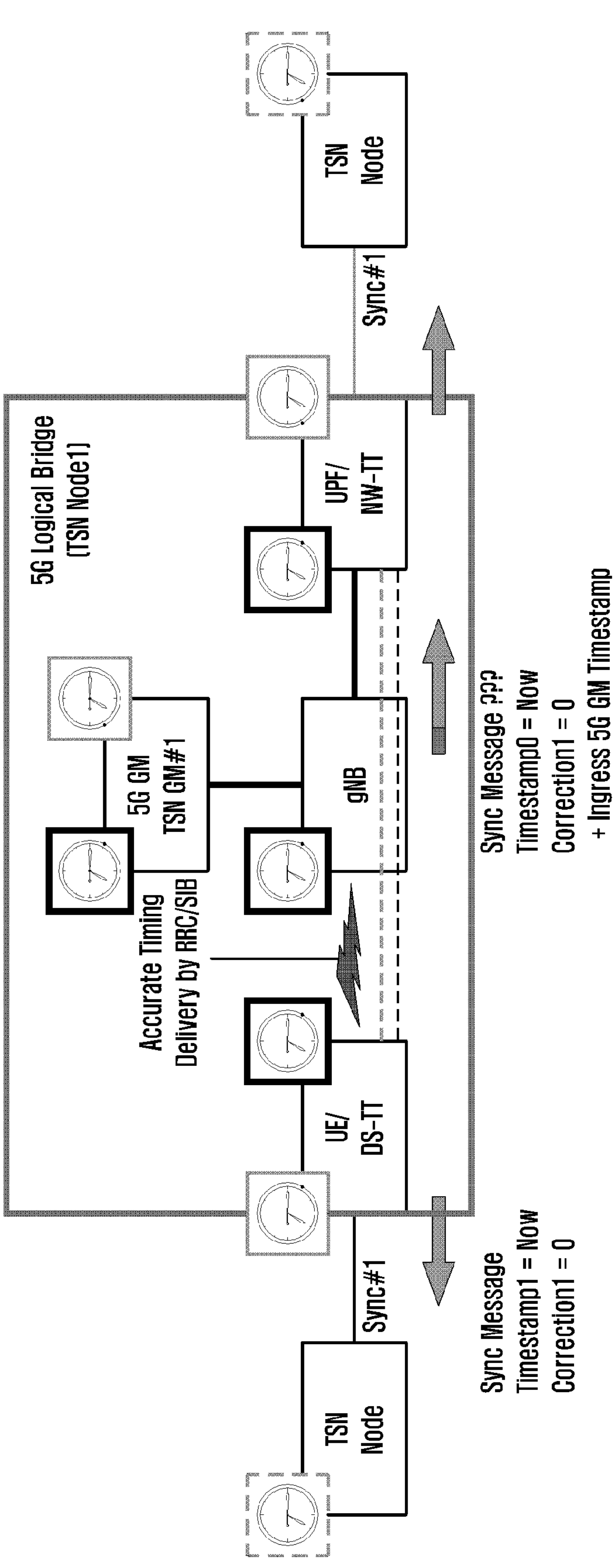
FIG. 4B illustrates a method in which UEs can generate and provide a sync message to outside based on a 5GS clock with 5G UE/DS-TT, and VIAPA support examples using the method.
Figure 4D:
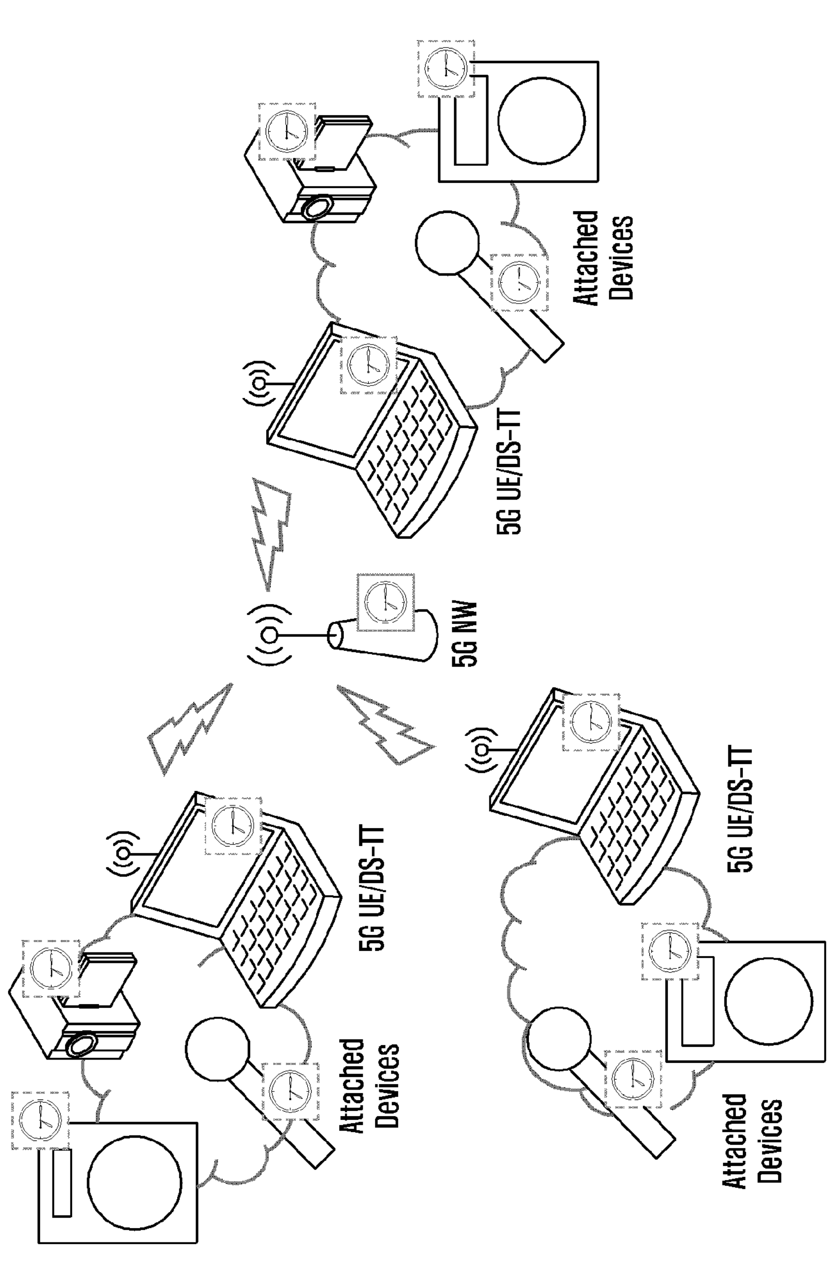
FIG. 4D illustrates a method in which UEs can generate and provide a sync message to outside based on a 5GS clock with 5G UE/DS-TT, and VIAPA support examples using the method.

FIG. 4A is related to synchronization using a sync message provided by a UPF/network-side translator (NW-TT), and FIG. 4B is related to synchronization using a sync message provided by a UE/DS-TT. FIG. 4C illustrates a method in which UE/DS-TT provides synchronization using a time reference. FIG. 4D shows examples of video, imaging and audio for professional applications (VIAPA) using synchronization provided by 5GS. A mixing system is a 5G UE/DS-TT, and a camera, a microphone, and a speaker are connected to neighboring mixing systems. Since the mixing systems are the 5G UE/DS-TT, they maintain mutual clock sync through reception of the sync message from the 5G network. The camera, the microphone, and the speaker receive the sync message delivered from the neighboring mixing system, and maintain the clock sync among the devices. Through this, a harmonious performance is achieved through adjustment of the generation time of the video/sound/image.

Figure 5:
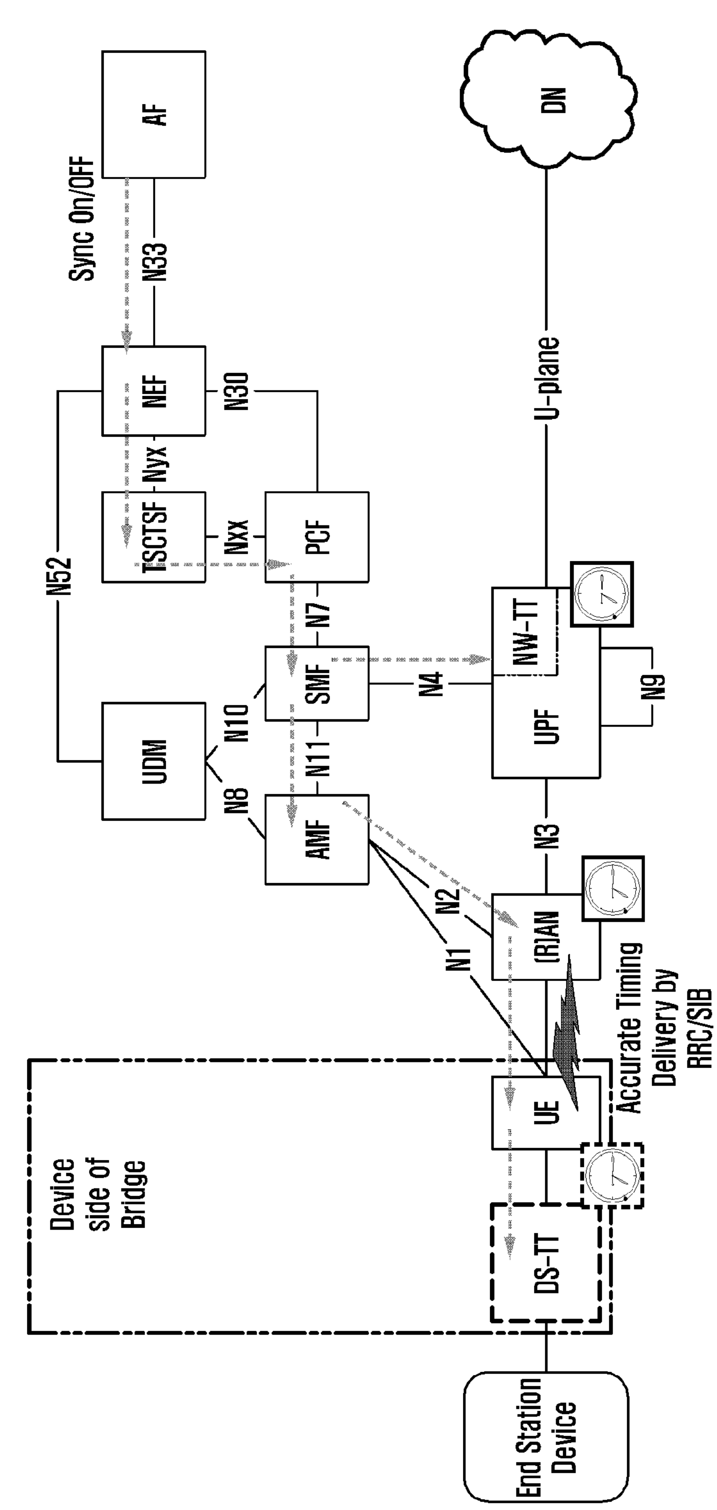
FIG. 5 illustrates a configuration method in which 5GS becomes a synchronization source.

FIG. 5 illustrates a configuration method in which 5GS becomes a synchronization source. In case that 5GS interworks with a TSN system, a TSN application function (AF) interworks with a centralized network configuration (CNC) server, and exchanges management information with the CNC server. The TSN AF may read management information of NW-TT and DS-TT, and may change the configuration by delivering management information to the NW-TT and the DS-TT.

In case that the TSN AF is absent, the 5GS interworks with an external application function (AF) through NEF2. In this case, the NEF may perform a function similar to that having been performed by the TSN AF. Instead of the network exposure function (NEF), a time sensitive communication and time synchronization function (TSCTSF) may perform the function. The TSCTSF/NEF may exchange the management information with the NW-TT and the DS-TT. Further, in order to deliver information of the 5GS to an external AF or to apply requirements of the external AF to the 5GS system, the TSCTSF/NEF may interwork with a session management function (SMF), an access and mobility management function (AMF), a policy control function (PCF), and a unified data repository (UDR). In particular, the TSCTSF/NEF may store necessary information in the UDR, and may deliver information updated through a notification to the UDM or the PCF through a notification process.

FIG. 6 illustrates a method for delivering management information to an idle-mode UE by using paging.

In a first step, an AF sends an activation/deactivation request of a 5GS sync service to an NEF. In this case, conditions to be added may include the following contents.

Valid time: Validity period of a request and so on

DNN/S-NSSAI: Data network name and network slice ID of PDU session

UE ID(s): Target UE ID (GPSI or etc.) and so on

Group ID(s): External group ID and so on designated by an AF

UE capability: Sync support, DS-TT support, DS-TT GM support, sync generation support and so on UE type: Sync UE, TSC and IoT UEs, and so on UE indication: Indication indicating that a sync service is necessary and so on TAI: Location on a 5G system of a target UE based on a cell ID Location: Physical location of a UE Application ID: ID of an application requested by an AF GM: indicating whether to use a 5G GM or an external TSN GM Master port: NW-TT/DS-TT port Sync message format: gPTP/PTP Sync domain: domain1 (this is a time sync domain, and may be omitted.)

DST IP Info1: IP address of an external node that becomes a target when a PTP message is used Sync accuracy: Time stamp period or granularity In the first step, if no delivery method is specified, the existing method using the paging is performed.

In a second step, the TSCTSF/NEF may convert some information among the conditions received in the first step. A generic public subscription identifier (GPSI) may be converted into an international mobile subscriber identity (IMSI) used inside the 5GS, and an external group ID may be converted into an internal group ID that is used inside the 5GS. A sync clock domain provided by the AF may be converted by the NEF. The NEF may separately allocate domain #n to combinations of several conditions, such as the UE ID, group ID, DNN/S-NSSAI, and valid time. While requesting activation of the sync based on the 5G GM clock, the AF may not specify a separate domain, or may specify the domain. The NEF having received the request separately allocates domain #n to the 5GS bridge so as not to conflict with the domain id already allocated to the 5GS bridge.

If the corresponding PDU session is already present, the step moves to a sixth step, and if the PDU session for the corresponding UE is not yet present, or if the PDU session corresponds to a plurality of UEs, the NEF/TS CTSF, in a third step, stores conditions including the valid time, SUPI, and domain #n in the UDR, and if necessary, it provides UDR notification to the UDM, or provides a notification to the PCF afterwards.

In a 3a-th step, the NEF may respond to the AF that the requested contents including the converted domain #n are well reflected in the 5GS.

In a fourth step, the UE/DS-TT sends a PDU session request to the SMF. This request includes the conditions of DNN/S-NSSAI, PDU session type, DS-TT capability, and device type. The SMF may bring and compare subscriber information from the UDM, and may determine whether to proceed with the subsequent PDU session process. If it is determined to continue the process, the SMF registers the PDU session corresponding to the UDM. Further, in accordance with this request, the policy session between the SMF and the PCF is configured.

In a fifth step, during the PDU session registration, the UDR identifies whether the PDU session information matches the conditions in accordance with the information delivered through the UDM. In case that the PDU session information matches the conditions, the TSCTSF/NEF is notified of the matched PDU session information.

In a sixth step, sync activation is performed to meet the matched conditions. That is, in a 6a-th step, the TSCTSF/NEF sends an activation/deactivation request to the PCF. Here, the request includes information that is delivered through bridge management information or port management information directed to the UPF/NW-TT or the DS-TT/UE, and a quality of service (QOS) configuration message for a QoS flow in the corresponding PDU session.

In a 6b-th step, the PCF delivers BMIC or PMIC information received from the NEF to the SMF as it is, and delivers the QoS related information to the SMF after correcting the same through an internal 5G QoS identifier (5QI) identification. In a 6c-th step, the SMF delivers a sync activation/deactivation request to the UPF/NW-TT. In this case, a bridge management information container (BMIC) or a port management information container (PMIC) for the domain #n may be used. In a 6d-th step, the SMF delivers the sync activation/deactivation request to the UE/DS-TT. In this case, the PMIC for the domain #n may be used.

In a 7a-th step, in accordance with the conditions configured in the sixth step, the UPF/NW-TT may transmit a sync message between the NW-TT and the DS-TT in the method as described above with reference to FIGS. 4A and 4B, or may not transmit the sync message at all as in FIG. 4C. In case that the sync message is not transmitted, the traffic occurrence is reduced, and thus the load of the UE/equipment can be reduced, and the power consumption can be reduced.

In a 7b-th step, the DS-TT calculates the residence time that is the time spent in the 5G network by using an egress time that is the time when the sync message delivered by the NW-TT in the 7a-th step is transmitted outside the 5GS. The UE/DS-TT transmits the sync frame to the external next TSN node by updating a correction field by using the residence time and the link delay. In accordance with the configuration conditions in the sixth step, the DS-TT, in a 7b-th step, may generate and transmit the sync message to external nodes connected to the DS-TT. In this case, the time stamp of the sync message contains the generated time. Between the NW-TT and the DS-TT, the sync message may be transmitted in the method described with reference to FIGS. 4A, 4B, 4C, and 4D, or the sync message may not be transmitted at all. In case that the sync message is not transmitted, the traffic occurrence is reduced, and thus the load of the UE/equipment can be reduced, and the power consumption can be reduced.

In an eighth step, the UE/DS-TT may be changed to an idle mode if there is not the traffic transmission for a while.

In a ninth step, the sync activation/deactivation request for the idle-mode UE may be delivered. The detailed contents are the same as those in the first step.

In a 9a-th step, the validity time condition delivered in the first step may be expired, and thus the TSCTSF/NEF may request the sync activation/deactivation from the inside of the 5GS.

In a 10a-th step, the TSCTSF/NEF sends the activation/deactivation request to the PCF. Here, the request includes information that is delivered through bridge management information or port management information directed to the UPF/NW-TT or the DS-TT/UE, and a QoS configuration message for a QoS flow in the corresponding PDU session.

In a 10b-th step, the PCF delivers BMIC or PMIC information received from the NEF to the SMF as it is, and delivers the QoS related information to the SMF after correcting the same through internal 5QI identification.

In a 10c step, the SMF delivers the sync activation/deactivation request to the UPF/NW-TT. In this case, the bridge management information container (BMIC) or the port management information container (PMIC) for the domain #n may be used.

In a 10d-th step, the SMF delivers the sync activation/deactivation request to the UE/DS-TT. In this case, the PMIC for the domain #n may be used.

In an eleventh step, the AMF performs a paging step with respect to the idle-mode UE, and makes the UE be changed to the connected mode. In a twelfth step, the AMF delivers the PMIC received from the SMF to the connected-mode UE.

FIG. 7 explains addition of a notification procedure during paging failure in a method for delivering management information to an idle-mode UE by using paging.

Since the SMF/PCF/TSCTSF/NEF/AF having received a notification of the paging failure can determine the state, there is an advantage in being able to find alternatives, such as whether to retransmit or abandon the paging.

Since the first step to the tenth step are the same as the first step to the tenth step of FIG. 6, the duplicate description thereof will be omitted.

In the eleventh step, although the AMF attempts the paging with respect to the UE, it is unable to be connected to the UE in spite of repetitive implementation with widening of the range to cause the paging to fail.

In the twelfth step, the AMF may notify the SMF of information delivery failure due to the paging failure. The SMF may deliver the information delivery failure due to the paging failure to the PCF. The PCF may deliver the information delivery failure due to the paging failure to the TSCTSF/NEF. The TSCTSF/NEF may deliver the information delivery failure due to the paging failure to the AF.

FIG. 8 explains addition of a procedure in which 5GCN delivers a 5G timing reference control to RAN by using a QoS configuration process to a method for delivering management information.

Since timing reference control signaling is delivered by using the QoS configuration process for the individual flow in the PDU session being also previously needed, there is an advantage of reducing the burden of the separate AM policy configuration signaling.

The first step to the fourth step is the same as the first step to the fourth step of FIG. 6. In the fifth step, during the PDU session registration, the UDR identifies whether the PDU session information matches the conditions in accordance with the information delivered through the UDM. In case that the PDU session information matches the conditions, the TSCTSF/NEF is notified of the matched PDU session information.

In the 5a-th step, the TSCTSF/NEF sends the QoS request to the PCF. Here, the granularity requirements for the sync are reflected in the QoS request.

In the 5b-th step, the PCF performs correction, such as 5QI reflection, and sends the contents thereof to the SMF.

In the 5c-th step, the SMF delivers this request to the AMF.

In the 5d-th step, the AMF sends the configuration for the QoS request to the RAN. Here, the configuration for the UE may be included or may not be included in the configuration for the QoS request. The RAN configuration request may be a 5GS time reference on/off type for synchronization, or may be an allowed error type for synchronization granularity. Accordingly, the RAN supports sync requirements by adjusting SIB delivery for delivering the 5GS time reference or adjusting timing advance configuration for each individual UE.

In the 5e-th step, the RAN may deliver necessary QoS related configuration to the UE. In the 5f-th step, the SMF delivers the QoS configuration contents to the UPF/NW-TT. The sixth step to the eighth step is the same as the sixth step to the eighth step of FIG. 6.

Figure 9:
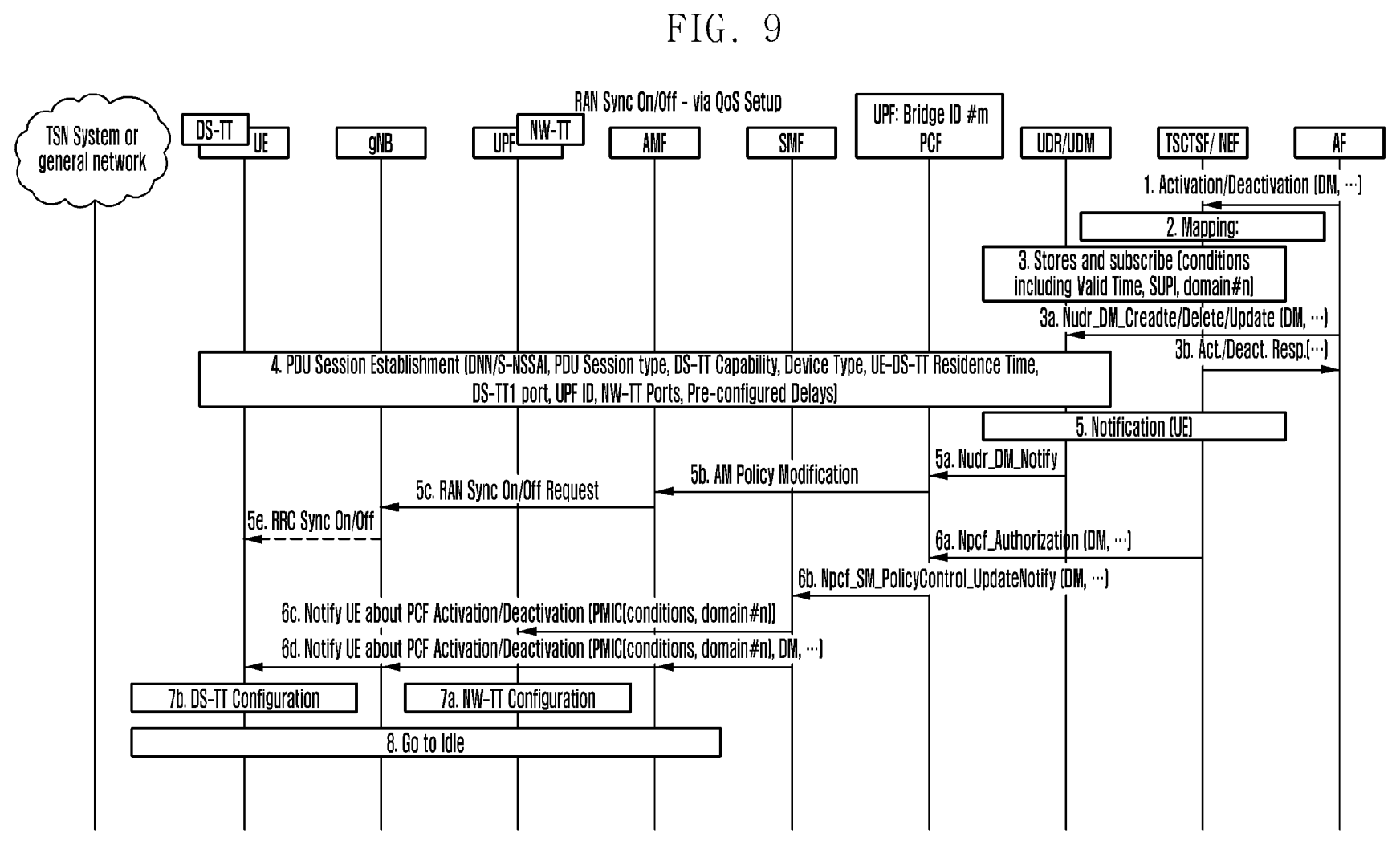

FIG. 9 explains addition of a procedure in which 5GCN delivers a 5G timing reference control to RAN by using an AM policy configuration process to a method for delivering management information. In case of using the AM policy configuration process, it is possible to apply the characteristics to several UEs at the same time, independent of the QoS configuration.

The first step to the second step is the same as the first step to the second step of FIG. 6.

If the corresponding PDU session is already present, the step moves to the sixth step, and if the PDU session for the corresponding UE is not yet present, or if the PDU session corresponds to a plurality of UEs, the TSCTSF/NEF, in the third step, stores the conditions including the valid time, SUPI, and domain #n in the UDR, and if necessary, it provides the UDR notification to the UDM, or provides the notification to the PCF afterwards.

In the 3a-th step, the TSCTSF/NEF may store the sync requirements or 5G time reference on/off signal in the UDM.

In the 3b-th step, the NEF may respond to the AF that the requested contents including the converted domain #n are well reflected in the 5GS.

The fourth step is the same as the fourth step of FIG. 6.

In the fifth step, during the PDU session registration, the UDR identifies whether the PDU session information matches the conditions in accordance with the information delivered through the UDM. In case that the PDU session information matches the conditions, the TSCTSF/NEF is notified of the matched PDU session information.

In the 5a-th step, the UDR notifies the PCF of the sync requirements or the 5G time reference on/off signal.

In the 5b-th step, the PCF notifies the AMF of the sync requirements or the 5G time reference on/off signal.

In the 5c-th step, the AMF delivers the sync requirements or the 5G time reference on/off signal to the RAN. The RAN configuration request may be the 5GS time reference on/off type for the synchronization, or may be the allowed error type for the synchronization granularity. Accordingly, the RAN supports the sync requirements by adjusting the system information block (SIB) delivery for delivering the 5GS time reference or adjusting the timing advance configuration for each individual UE.

In the 5d-th step, RRC signaling between the RAN and the UE may be additionally performed.

The sixth step to the eighth step is the same as the sixth step to the eighth step of FIG. 6.

FIG. 10 illustrates a method in which TSCTSF/NEF delivers management information only to a connected-mode UE while managing a validity time. The idle-mode UE may be applied only in case that the operation does not make a big difference depending on the sync on/off configuration change. Whether to apply this method may be determined by the AF or the TSCTSF/NEF depending on the current synchronization requirements.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method only to the connected-mode UE. The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified that the delivery method is delivered only to the connected-mode UE.

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used.

In the 5d-th step, the SMF delivers the sync activation/deactivation request from the UE/DS-TT to the AMF. In this case, the PMIC for the domain #n may be used. Further, in this case, it is specified that the request is delivered only to the connected-mode UE that is the delivery method received in the third step or the 3a-th step.

Since the UE is in the idle mode, and the information delivery request in the 5d-th step is delivered only to the connected-mode UE, the AMF does not perform the paging step, and sends a delivery failure response to the SMF as in the sixth step. In this case, it may be specified that the cause is the UE in the idle mode.

In the 6a-th step, the SMF sends the PMIC delivery failure response to the PCF. In this case, it may be specified that the cause is the UE in the idle mode.

In the 6b-th step, the PCF sends the PMIC delivery response to the TSCTSF/NEF. In this case, it may be specified that the cause is the UE in the idle mode.

In the 6c-th step, the TSCTSF/NEF may send a delivery failure notification to the AF. In this case, it may be specified that the cause is the UE in the idle mode.

In the 7a-th step, the UPF/NW-TT changes the UPF/NW-TT configuration depending on the condition configured in the 5c-th step. The detailed contents are the same as those in the 7a-th step of FIG. 6.

Figure 11:
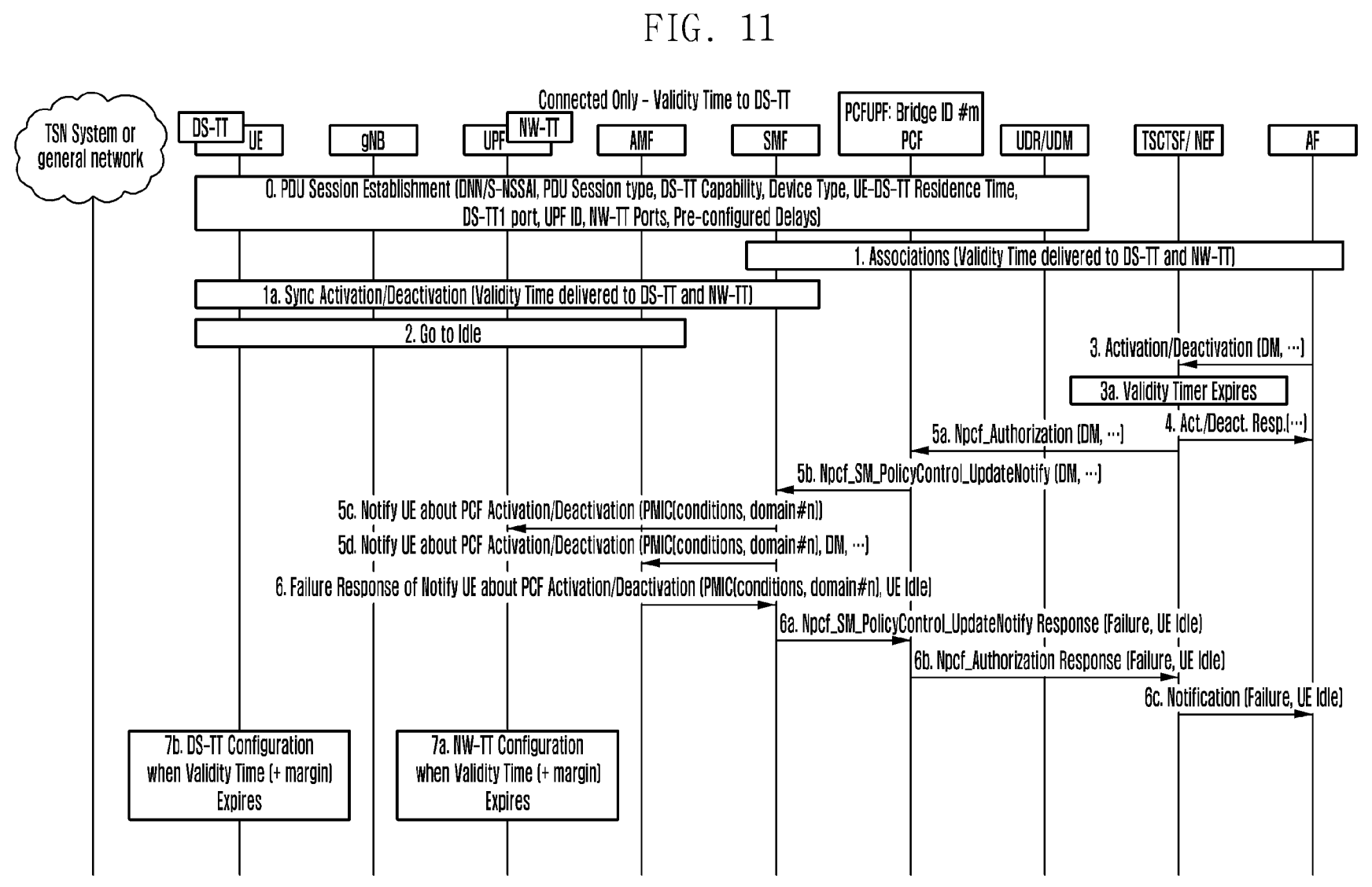

FIG. 11 illustrates a method in which UE/DS-TT delivers management information only to a connected-mode UE while managing a validity time.

This method may be applied in case that the UE/DS-TT and the UPF/NW-TT are able to manage the validity time. For this, these contents may be previously included in the DS-TT capability delivery process.

The 0-th step is the same as the first step to the fourth step of FIG. 6.

The first step and the 1a-th step are the same as the fifth step to the seventh step of FIG. 6, but in the sixth step of FIG. 6, the validity time condition is included and is delivered up to the UE/DS-TT and the UPF/NW-TT.

In the second step, the UE changes its mode to the idle mode, and waits.

In the third step, the sync activation/deactivation request may be delivered to the idle-mode UE. In the third step, it may be specified to deliver the delivery method only to the connected-mode UE. The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified that the delivery method is delivered only to the connected-mode UE.

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used. In the 5d-th step, the SMF delivers the sync activation/deactivation request from the UE/DS-TT to the AMF. In this case, the PMIC for the domain #n may be used. In this case, it is specified that the request is delivered only to the connected-mode UE that is the delivery method received in the third step or the 3a-th step.

Since the UE is in the idle mode, and the information delivery request in the 5d-th step is delivered only to the connected-mode UE, the AMF does not perform the paging step, and sends a delivery failure response to the SMF as in the sixth step. In this case, it may be specified that the cause is the UE in the idle mode.

In the 6a-th step, the SMF sends the PMIC delivery failure response to the PCF. In this case, it may be specified that the cause is the UE in the idle mode.

In the 6b-th step, the PCF sends the PMIC delivery response to the TSCTSF/NEF. In this case, it may be specified that the cause is the UE in the idle mode.

In the 6c-th step, the TSCTSF/NEF may send a delivery failure notification to the AF. In this case, it may be specified that the cause is the UE in the idle mode.

In the 3a-th step, in case that the validity time condition is expired, and the TSCTSF/NEF requests the sync activation/deactivation from the inside of the 5GS, the UPF/NW-TT can also recognize the expiration of the validity time condition in the 7a-th step, configuration to invalidate the sync activation/deactivation request according to the existing request may be performed. In this case, in order to wait for the management information delivery from the TSCTSF/NEF or the AF, an additional timer may be applied. In the 7a-th step, the UPF/NW-TT may change the UPF/NW-TT configuration depending on the condition configured in the 5c-th step.

In the 3a-th step, in case that the validity time condition is expired, and the TSCTSF/NEF requests the sync activation/deactivation from the inside of the 5GS, since the UE/DS-TT can also recognize the expiration of the validity time condition in the 7b-th step, configuration to invalidate the sync activation/deactivation request according to the existing request may be performed. In this case, in order to wait for the management information delivery from the TSCTSF/NEF or the AF, an additional timer may be applied.

FIG. 12 illustrates a method in which CN delivers management information only to a connected-mode UE in case that the CN delivers a 5GS reference time control to RAN by using a QoS configuration process. This method may be applied in case that the RAN delivers the 5GS time reference even to the idle-mode UE in the SIB method or in case that the TA control is possible.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method only to the connected-mode UE. The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified that the delivery method is delivered only to the connected-mode UE.

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used.

In the 5d-th step, the SMF delivers the sync activation/deactivation request from the UE/DS-TT to the AMF. In this case, the PMIC for the domain #n may be used. In this case, it is specified that the request is delivered only to the connected-mode UE that is the delivery method received in the third step or the 3a-th step.

In the 5e-th step, the AMF delivers the RAN configuration request for the 5GS time reference on/off for the QoS configuration to the NG-RAN. The RAN configuration request may be the 5GS time reference on/off type for the synchronization, or the allowed error type for the synchronization granularity. Accordingly, the RAN supports the sync requirements by adjusting the SIB delivery for delivering the 5GS time reference or adjusting the timing advance configuration for each individual UE.

Since the UE is in the idle mode, and the information delivery request in the 5d-th step is delivered only to the connected-mode UE, the AMF does not perform the paging step, and sends a delivery failure response to the SMF as in the sixth step. In this case, it may be specified that the cause is the UE in the idle mode.

In the 6a-th step, the SMF sends the PMIC delivery failure response to the PCF. In this case, it may be specified that the cause is the UE in the idle mode.

In the 6b-th step, the PCF sends the PMIC delivery response to the TSCTSF/NEF. In this case, it may be specified that the cause is the UE in the idle mode.

In the 6c-th step, the TSCTSF/NEF may send a delivery failure notification to the AF.

In this case, it may be specified that the cause is the UE in the idle mode.

In the 7a-th step, the UPF/NW-TT updates the NW-TT configuration based on the information delivered in the 5c-th step.

In the eighth step, the UE recognizes that the synchronization related 5GS time reference delivery configuration of the RAN has been changed through signaling for being changed to the connected mode or RRC signaling for another purpose.

In the 8a-th step, the UE/DS-TT identifies that the synchronization related RRC configuration and the UE/DS-TT configuration are different from each other, and changes the UE/DS-TT configuration to match the RRC configuration.

FIG. 13 illustrates a method in which CN delivers management information only to a connected-mode UE in case that the CN delivers a 5GS reference time control to RAN by using an AM policy configuration process. This method may be applied in case that the RAN delivers the 5GS time reference even to the idle-mode UE in an SIB method or TA control is possible.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method only to the connected-mode UE. The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified that the delivery method is delivered only to the connected-mode UE.

In the fourth step, the NEF may respond to the AF that the requested contents including the converted domain #n are well reflected in the 5GS.

In the 4a-th step, the TSCTSF/NEF stores sync requirements or a 5G time reference on/off signal in the UDM.

In the 4b-th step, the UDR notifies the PCF of the sync requirements or the 5G time reference on/off signal.

In the 4c-th step, the PCF notifies the AMF of the sync requirements or the 5G time reference on/off signal.

In the 4d-th step, the AMF delivers the sync requirements or the 5G time reference on/off signal to the RAN. The RAN configuration request may be the 5GS time reference on/off type for the synchronization, or may be the allowed error type for the synchronization granularity. Accordingly, the RAN supports the sync requirements by adjusting the SIB delivery for delivering the 5GS time reference or adjusting the timing advance configuration for each individual UE.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used.

In the 5d-th step, the SMF delivers the sync activation/deactivation request from the UE/DS-TT to the AMF. In this case, the PMIC for the domain #n may be used. In this case, it is specified that the request is delivered only to the connected-mode UE that is the delivery method received in the third step or the 3a-th step.

Since the UE is in the idle mode, and the information delivery request in the 5d-th step is delivered only to the connected-mode UE, the AMF does not perform the paging step, and sends a delivery failure response to the SMF as in the sixth step. In this case, it may be specified that the cause is the UE in the idle mode.

In the 6a-th step, the SMF sends the PMIC delivery failure response to the PCF. In this case, it may be specified that the cause is the UE in the idle mode.

In the 6b-th step, the PCF sends the PMIC delivery response to the TSCTSF/NEF. In this case, it may be specified that the cause is the UE in the idle mode.

In the 6c-th step, the TSCTSF/NEF may send a delivery failure notification to the AF. In this case, it may be specified that the cause is the UE in the idle mode.

In the 7a-th step, the UPF/NW-TT updates the NW-TT configuration based on the information delivered in the 5c-th step.

In the eighth step, the UE recognizes that the synchronization related 5GS time reference delivery configuration of the RAN has been changed through signaling for being changed to the connected mode or RRC signaling for another purpose.

In the 8a-th step, the UE/DS-TT identifies that the synchronization related RRC configuration and the UE/DS-TT configuration are different from each other, and changes the UE/DS-TT configuration to match the RRC configuration.

Figure 14:
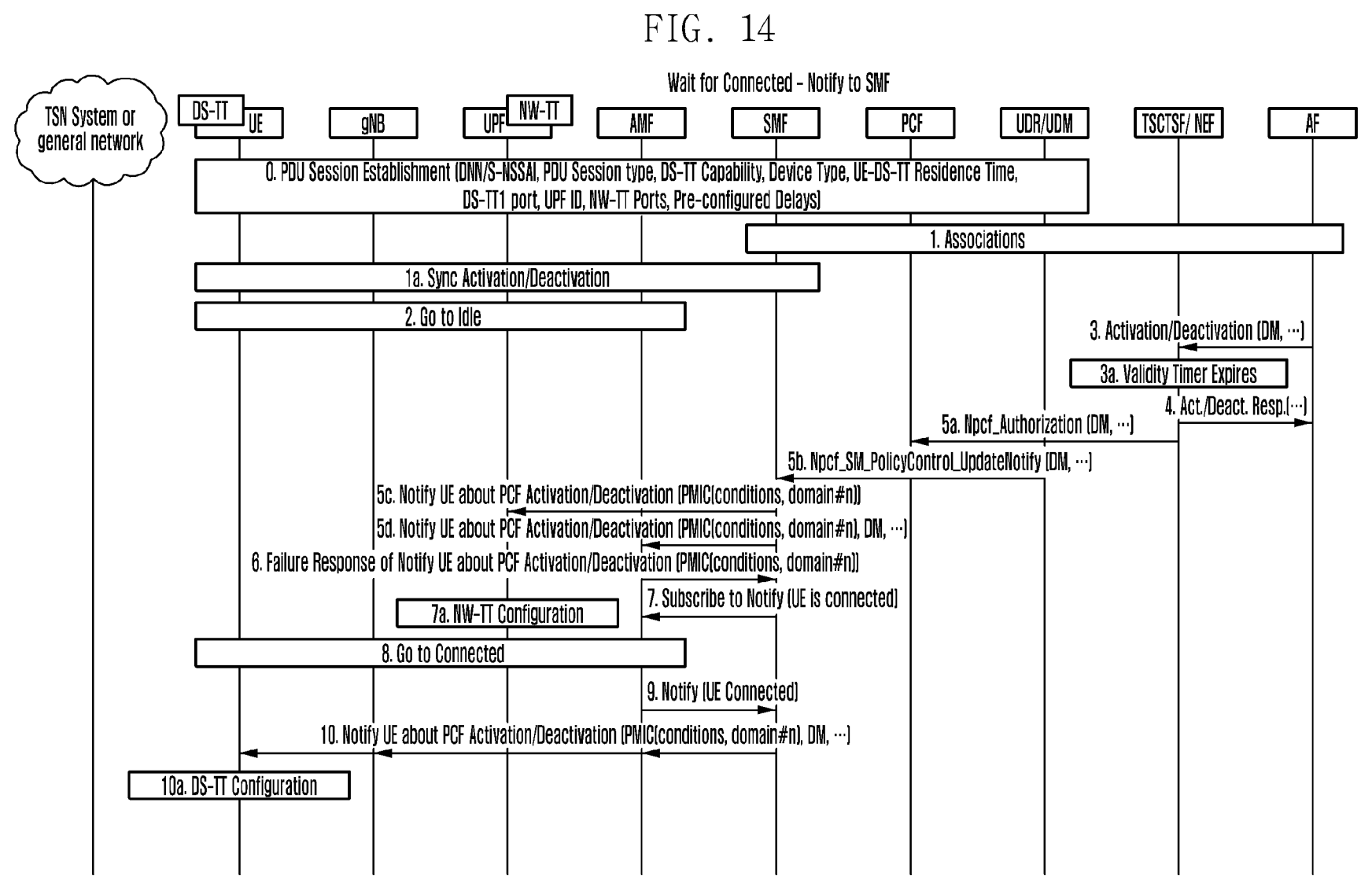

FIG. 14 illustrates a method in which SMF delivers management information after waiting for an idle-mode UE to move to a connected mode. In this case, the SMF should store the PMIC, but since only signaling between the AMF and the SMF occurs, there is the advantage that the signaling occurs relatively rarely.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method after waiting for the idle-mode UE to be switched to the connected mode by configuring the delivery method to "wait for connected". The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified to deliver the delivery method after waiting for the idle-mode UE to be switched to the connected mode by configuring the delivery method to "wait for connected".

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used.

In the 5d-th step, the SMF delivers the sync activation/deactivation request from the UE/DS-TT to the AMF. In this case, the PMIC for the domain #n may be used. In this case, it is specified that the request is delivered after the "wait for connected" that is the delivery method received in the third step or the 3a-th step, that is, after waiting for the idle-mode UE to be switched to the connected mode.

Since the UE is in the idle mode, and the information delivery request in the 5d-th step is delivered after waiting for the idle-mode UE to be switched to the connected mode, the AMF does not perform the paging step, and sends a delivery failure response to the SMF as in the sixth step. In this case, it may be specified that the cause is the UE in the idle mode.

In the seventh step, the SMF sends, to the AMF, a request for being notified in case that the UE is changed to the connected mode.

As another method, the AMF having received the information delivery request in the 5d-th step may wait for the idle-mode UE to be switched to the connected mode, and then may deliver the PMIC having been received from the SMF to the UE immediately after the UE is switched to the connected mode, without performing the paging step. In this case, the sixth step to the tenth step is omitted, and the 10a-th step is immediately performed. In this case, although there is a burden for the AMF to store the PMIC message, there is an advantage to minimize the signaling occurrence.

In the 7a-th step, the UPF/NW-TT changes the NW-TT configuration in accordance with the condition configured in the 5c-th step. The detailed contents are the same as those in the 7a-th step of FIG. 6.

In the eighth step, the UE is switched to the connected mode.

In the ninth step, the AMF notifies the SMF that the UE has been switched to the connected mode.

In the tenth step, the SMF delivers the sync activation/deactivation request for the UE/DS-TT to the AMF. In this case, the PMIC for the domain #n may be used. The AMF delivers the PMIC received from the SMF to the connected-mode UE. In the 10a-th step, the DS-TT applies the configuration as requested.

As another method, before the third step or the 3a-th step, the SMF may send, to the AMF, a request for being notified in case that the UE is changed to the idle/connected mode. In this case, the 5d-th step, the sixth step, and the seventh step may be omitted. In this case, it may be configured to deliver the delivery method only to the connected-mode UE.

FIG. 15 illustrates a method in which PCF delivers management information after waiting for an idle-mode UE to move to a connected mode. In this case, although there is a burden for the PCF to take responsibility for PMIC delivery, there is an advantage of easily re-identifying the policy at the time for delivering the management information to the UE.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method after waiting for the idle-mode UE to be switched to the connected mode by configuring the delivery method to "wait for connected". The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified to deliver the delivery method after waiting for the idle-mode UE to be switched to the connected mode by configuring the delivery method to "wait for connected".

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used.

In the 5d-th step, the SMF delivers the sync activation/deactivation request from the UE/DS-TT to the AMF. In this case, the PMIC for the domain #n may be used. In this case, it is specified that the request is delivered after the "wait for connected" that is the delivery method received in the third step or the 3a-th step, that is, after waiting for the idle-mode UE to be switched to the connected mode.

Since the UE is in the idle mode, and the information delivery request in the 5d-th step is delivered after waiting for the idle-mode UE to be switched to the connected mode, the AMF does not perform the paging step, and sends a delivery failure response to the SMF as in the sixth step. In this case, it may be specified that the cause is the UE in the idle mode. Then, the SMF notifies the PCF of the information delivery failure. Also, it may be specified that the cause is the UE in the idle mode.

In the seventh step, the PCF sends, to the SMF, a request for being notified in case that the UE is changed to the connected mode, and the SMF sends, to the AMF, a request for being notified in case that the UE is changed to the connected mode. In this case, the PCF may immediately send, to the AMF, a request for being notified in case that the UE is changed to the connected mode without passing through the SMF.

In the 7a-th step, the UPF/NW-TT changes the NW-TT configuration in accordance with the condition configured in the 5c-th step. The detailed contents are the same as those in the 7a-th step of FIG. 6.

In the eighth step, the UE is switched to the connected mode.

In the ninth step, the AMF notifies the SMF that the UE has been switched to the connected mode. Then, the SMF notifies the PCF that the UE has been switched to the connected mode. In this case, the AMF may immediately notify the PCF that the UE has been switched to the connected mode.

In the tenth step, the PCF delivers the sync activation/deactivation request for the UE/DS-TT to the SMF. In this case, the PMIC for the domain #n may be used. Then, the SMF delivers the sync activation/deactivation request for the UE/DS-TT to the AMF. The AMF delivers the PMIC received from the SMF to the connected-mode UE.

In the 10a-th step, the DS-TT applies the configuration as requested.

As another method, before the third step or the 3a-th step, the PCF may send, to the SMF, a request for being notified in case that the UE is changed to the idle/connected mode, and the SMF may send, to the AMF, a request for being notified in case that the UE is changed to the idle/connected mode. In this case, the PCF may immediately send, to the AMF, a request for being notified in case that the UE is changed to the idle/connected mode, without passing through the SMF. In this case, the 5d-th step, the sixth step, and the seventh step may be omitted. In this case, it may be configured to deliver the delivery method only to the connected-mode UE.

Figure 16:
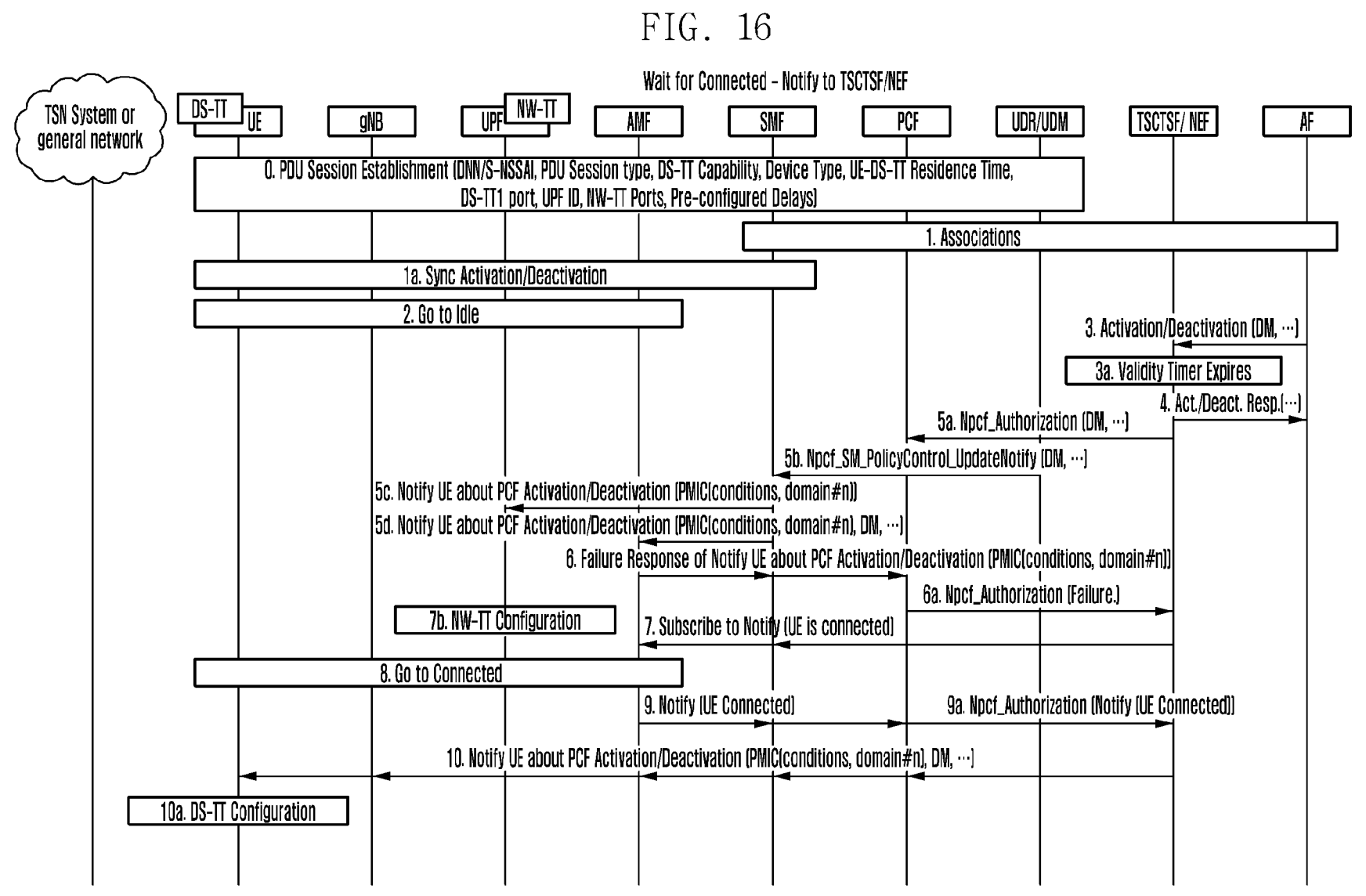

FIG. 16 illustrates a method in which TSCTSF/NEF delivers management information after waiting for an idle-mode UE to move to a connected mode. In this case, the signaling path is increased up to the TSCTSF/NEF, but since the TSCTSF/NEF having been originally in charge of the PMIC delivery continuously takes responsibility for the retransmission, there is an advantage of less additional implementation burden.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method after waiting for the idle-mode UE to be switched to the connected mode by configuring the delivery method to "wait for connected". The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified to deliver the delivery method after waiting for the idle-mode UE to be switched to the connected mode by configuring the delivery method to "wait for connected".

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification.

In the 5c-th step, the SMF delivers the sync activation/deactivation request to the UPF/NW-TT. In this case, the bridge management information container (BMIC) or the port management information container (PMIC) for the domain #n may be used. In the 5d-th step, the SMF delivers the sync activation/deactivation request from the UE/DS-TT to the AMF. In this case, the PMIC for the domain #n may be used. In this case, it is specified that the request is delivered after the "wait for connected" that is the delivery method received in the third step or the 3a-th step, that is, after waiting for the idle-mode UE to be switched to the connected mode.

Since the UE is in the idle mode, and the information delivery request in the 5d-th step is delivered after waiting for the idle-mode UE to be switched to the connected mode, the AMF does not perform the paging step, and sends a delivery failure response to the SMF as in the sixth step. In this case, it may be specified that the cause is the UE in the idle mode. Then, the SMF notifies the PCF of the information delivery failure. Also, it may be specified that the cause is the UE in the idle mode.

In the 6a-th step, the PCF notifies the TSCTSF/NEF of the information delivery failure. In this case, it may be specified that the cause is the UE in the idle mode.

In the seventh step, the TSCTSF/NEF sends, to the SMF, a request for being notified in case that the UE is changed to the connected mode, the PCF sends, to the SMF, a request for being notified in case that the UE is changed to the connected mode, and the SMF sends, to the AMF, a request for being notified in case that the UE is changed to the connected mode. In this case, the PCF may immediately send, to the AMF, a request for being notified in case that the UE is changed to the connected mode without passing through the SMF. Or, the TSCTSF/NEF may immediately send, to the AMF, a request for being notified in case that the UE is changed to the connected mode without passing through the SMF.

In the 7a-th step, the UPF/NW-TT changes the NW-TT configuration in accordance with the condition configured in the 5c-th step. The detailed contents are the same as those in the 7a-th step of FIG. 6.

In the eighth step, the UE is switched to the connected mode.

In the ninth step, the AMF notifies the SMF that the UE has been switched to the connected mode. Then, the SMF notifies the PCF that the UE has been switched to the connected mode. Then, the PCF notifies the TSCTSF/NEF that the UE has been switched to the connected mode. In this case, in accordance with the operation in the seventh step, the AMF may immediately notify the SMF that the UE has been switched to the connected mode through the PCF, or the AMF may immediately notify the SMF that the UE has been switched to the connected mode through the TSCTSF/NEF.

In the tenth step, the TSCTSF/NEF delivers the sync activation/deactivation request for the UE/DS-TT to the PCF. In this case, the PMIC for the domain #n may be used. Then, the PCF delivers the sync activation/deactivation request for the UE/DS-TT to the SMF. Then, the SMF delivers the sync activation/deactivation request for the UE/DS-TT to the AMF. The AMF delivers the PMIC received from the SMF to the connected-mode UE. In the 10a-th step, the DS-TT applies the configuration as requested.

As another method, before the third step or the 3a-th step, the TSCTSF/NEF may send, to the PCF, a request for being notified in case that the UE is changed to the idle/connected mode, the PCF may send, to the SMF, a request for being notified in case that the UE is changed to the idle/connected mode, and the SMF may send, to the AMF, a request for being notified in case that the UE is changed to the idle/connected mode. In this case, the PCF may immediately send, to the AMF, a request for being notified in case that the UE is changed to the idle/connected mode, without passing through the SMF. Or, the TSCTSF/NEF may immediately send, to the AMF, a request for being notified in case that the UE is changed to the idle/connected mode, without passing through the PCF or the SMF. In this case, the 5d-th step, the sixth step, and the seventh step may be omitted. In this case, it may be configured to deliver the delivery method only to the connected-mode UE.

FIG. 17 illustrates a method in which AF delivers management information after waiting for an idle-mode UE to move to a connected mode. In this case, there is a burden of delivering the UE inside the 5GS and the idle/connected state information of the UE to an external AF, but since the original source of the sync activation/deactivation request is the AF, there is an advantage of requiring less additional burden on the AF even if being responsible for retransmission.

The 0-th step is the same as the first step to the fourth step of FIG. 6.

The first step and the 1a-th step are the same as the fifth step to the seventh step of FIG. 6.

In the second step, the UE changes its mode to the idle mode, and waits.

In the third step, the sync activation/deactivation request may be delivered to the idle-mode UE. In the third step, it may be specified to deliver the delivery method after waiting for the idle-mode UE to be switched to the connected mode by configuring the delivery method to "wait for connected". The detailed contents are the same as those in the first step of FIG. 6.

In the 3a-th step, the validity time condition delivered in the first step may be expired, and the TSCTSF/NEF may request the sync activation/deactivation from the inside of the 5GS. In the 3a-th step, it may be specified to deliver the delivery method after waiting for the idle-mode UE to be switched to the connected mode by configuring the delivery method to "wait for connected".

In the fourth step, the NEF may respond to the AF that the requested contents including the converted domain #n are well reflected in the 5GS.

In the 5a-th step, the TSCTSF/NEF sends the activation/deactivation request to the PCF. Here, the request includes information that is delivered through the bridge management information or the port management information directed to the UPF/NW-TT or the DS-TT/UE, and the QoS configuration message for the QoS flow in the corresponding PDU session.

In the 5b-th step, the PCF delivers the BMIC or PMIC information received from the NEF to the SMF as it is, and delivers the QoS related information to the SMF after correcting the same through the internal 5QI identification. In the 5c-th step, the SMF delivers the sync activation/deactivation request to the UPF/NW-TT. In this case, the bridge management information container (BMIC) or the port management information container (PMIC) for the domain #n may be used. In the 5d-th step, the SMF delivers the sync activation/deactivation request from the UE/DS-TT to the AMF. In this case, the PMIC for the domain #n may be used. In this case, it is specified that the request is delivered after the "wait for connected" that is the delivery method received in the third step or the 3a-th step, that is, after waiting for the idle-mode UE to be switched to the connected mode.

Since the UE is in the idle mode, and the information delivery request in the 5d-th step is delivered after waiting for the idle-mode UE to be switched to the connected mode, the AMF does not perform the paging step, and sends a delivery failure response to the SMF as in the sixth step. In this case, it may be specified that the cause is the UE in the idle mode. Then, the SMF notifies the PCF of the information delivery failure. Also, it may be specified that the cause is the UE in the idle mode. Then, the PCF notifies the TSCTSF/NEF of the information delivery failure. In this case, it may be specified that the cause is the UE in the idle mode. Then, the TSCTSF/NEF notifies the AF of the delivery failure. In this case, the TSCTSF/NEF may perform conversion between SUPI and GPSI with respect to the ID of the UE. In this case, it may be specified that the cause is the UE in the idle mode.

In the seventh step, the AF sends a request for being notified in case that the UE is changed to the connected mode, the TSCTSF/NEF sends, to the PCF, a request for being notified in case that the UE is changed to the connected mode, the PCF sends, to the SMF, a request for being notified in case that the UE is changed to the connected mode, and the SMF sends, to the AMF, a request for being notified in case that the UE is changed to the connected mode. In this case, the PCF may immediately send, to the AMF, a request for being notified in case that the UE is changed to the connected mode without passing through the SMF. Or, the TSCTSF/NEF may immediately send, to the AMF, a request for being notified in case that the UE is changed to the connected mode without passing through the PCF or the SMF.

In the 7a-th step, the UPF/NW-TT changes the NW-TT configuration in accordance with the condition configured in the 5c-th step. The detailed contents are the same as those in the 7a-th step of FIG. 6.

In the eighth step, the UE is switched to the connected mode.

In the ninth step, the AMF notifies the SMF that the UE has been switched to the connected mode. Then, the SMF notifies the PCF that the UE has been switched to the connected mode. Then, the PCF notifies the TSCTSF/NEF that the UE has been switched to the connected mode. Then, the TSCTSF/NEF notifies the AF that the UE has been switched to the connected mode. In this case, the AF specifies the UE as GPSI, and the TSCTSF/NEF may perform the conversion between the SUPI and the GPSI with respect to the ID of the UE. In this case, in accordance with the operation in the seventh step, the AMF may immediately notify the SMF that the UE has been switched to the connected mode through the PCF, or the AMF may immediately notify the SMF that the UE has been switched to the connected mode through the TSCTSF/NEF.

In the tenth step, the AF sends, to the TSCTSF/NEF, the sync activation/deactivation request with respect to the UE specified as the GPSI or the like, and the TSCTSF/NEF delivers the sync activation/deactivation request for the UE/DS-TT to the PCF. In this case, the PMIC for the domain #n may be used. Then, the PCF delivers the sync activation/deactivation request for the UE/DS-TT to the SMF. Then, the SMF delivers the sync activation/deactivation request for the UE/DS-TT to the AMF. The AMF delivers the PMIC received from the SMF to the connected-mode UE. In the 10a-th step, the DS-TT applies the configuration as requested.

As another method, before the third step or the 3a-th step, the AF may send, to the TSCTSF/NEF, a request for being notified in case that the UE is changed to the idle/connected mode, the TSCTSF/NEF may send, to the PCF, a request for being notified in case that the UE is changed to the idle/connected mode, the PCF may send, to the SMF, a request for being notified in case that the UE is changed to the idle/connected mode, and the SMF may send, to the AMF, a request for being notified in case that the UE is changed to the idle/connected mode. In this case, the AF specifies the UE as the GPSI, and the TSCTSF/NEF may perform the conversion between the SUPI and the GPSI with respect to the ID of the UE. In this case, the PCF may immediately send, to the AMF, a request for being notified in case that the UE is changed to the idle/connected mode, without passing through the SMF. Or, the TSCTSF/NEF may immediately send, to the AMF, a request for being notified in case that the UE is changed to the idle/connected mode, without passing through the PCF or the SMF. In this case, the 5d-th step, the sixth step, and the seventh step may be omitted. In this case, it may be configured to deliver the delivery method only to the connected-mode UE.

Methods according to the claims or the embodiments described in the specification may be implemented in the form of hardware, software, or a combination of hardware and software.

In case of implementation by software, a computer readable storage medium storing one or more programs (software modules) may be provided. The one or more programs stored in the computer readable storage medium are configured for execution by one or more processors in the electronic device. The one or more programs include instructions causing the electronic device to execute the methods according to the claims of the disclosure or the embodiments described in the specification.

Such programs (software modules or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs), or other types of optical storage devices, and a magnetic cassette. Further, the programs may be stored in a memory composed of a combination of some or all of them. Further, a plurality of memories may be included in the respective configurations.

Further, the programs may be stored in an attachable storage device that can be accessible through a communication network composed of the Internet, Intranet, local area network (LAN), a wide LAN (WLAN), or a communication network, such as a storage area network (SAN), or a communication network composed of a combination thereof. Such a storage device may be connected to a device that performs an embodiment of the disclosure through an external port. Further, a separate storage device on a communication network may be connected to the device that performs the embodiment of the disclosure.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Meanwhile, although specified embodiments have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by a time sensitive communication and time synchronization function (TSCTSF) in a communication system, the method comprising:

receiving, from an application function (AF), a synchronization activation command;

generating management information based on the synchronization activation command, the management information including first management information associated with a network side-translator (NS-TT) configuration of a user plane function (UPF) and second management information associated with a device side-translator (DS-TT) configuration of a terminal; and delivering, via a policy control function (PCF), the first management information to a session management function (SMF) and the second management information to an access and mobility management function (AMF), wherein the second management information includes information indicating a time-based on/off for an idle-state terminal, and wherein the information indicating the time-based on/off is broadcasted through system information of a base station.

2. The method of claim 1, wherein the synchronization activation command includes condition information on a delivery of the management information, and wherein the condition information includes information for limiting a terminal to which third management information is delivered to a connected-state terminal.

3. The method of claim 2, further comprising:

receiving, from the PCF, a notification message notifying that the idle-state terminal has been changed to the connected-state terminal; and transmitting, to the PCF, a synchronization activation request, as a response to the notification message, wherein the third management information is transmitted to the connected-state terminal via the AMF from the PCF, based on the synchronization activation request, and wherein the third management information includes port management information for the DS-TT configuration of the connected-state terminal.

4. A method performed by an access and mobility management function (AMF) in a communication system, the method comprising:

receiving, from a time sensitive communication and time synchronization function (TSCTSF), management information associated with a device side-translator (DS-TT) configuration of a terminal;

identifying information indicating a time-based on/off for an idle-state terminal included in the management information; and transmitting, to a base station, the information indicating the time-based on/off, wherein the information indicating the time-based on/off is broadcasted through system information.

5. The method of claim 4, further comprising:

receiving, from the idle-state terminal, a notification message notifying that the idle-state terminal has been changed to a connected-state terminal;

delivering, via a policy control function (PCF), the notification message to the TSCTSF;

receiving, from the PCF, new management information, as a response to the notification message; and transmitting, to the connected-state terminal, the new management information, wherein the new management information includes port management information for the DS-TT configuration of the connected-state terminal.

6. A method performed by a terminal in a communication system, the method comprising:

receiving system information in an idle state;

identifying information indicating a time-based on/off included in the system information; and performing a synchronization operation based on the information indicating the time-based on/off, wherein management information associated with a device side-translator (DS-TT) configuration of the terminal is transmitted from a time sensitive communication and time synchronization function (TSCTSF) to an access and mobility management function (AMF), and wherein the management information includes the information indicating the time-based on/off for the terminal in the idle state.

7. The method of claim 6, further comprising:

switching from the idle state to a connected state;

receiving, from the AMF via a base station, new management information in case that the terminal switches to the connected state; and performing the synchronization operation based on the new management information, wherein the new management information is delivered from a policy control function (PCF) to the AMF based on the switching from the idle state to the connected state, and wherein the new management information includes port management information for the DS-TT configuration of the terminal switched to the connected state.

8. A time sensitive communication and time synchronization function (TSCTSF) in a communication system, the TSCTSF comprising:

a communication unit; and a controller configured to:

control the communication unit to receive, from an application function (AF), a synchronization activation command, generate management information based on the synchronization activation command, the management information including first management information associated with a network side-translator (NS-TT) configuration of a user plane function (UPF) and second management information associated with a device side-translator (DS-TT) configuration of a terminal, and control the communication unit to deliver, via a policy control function (PCF), the first management information to a session management function (SMF) and the second management information to an access and mobility management function (AMF), wherein the second management information includes information indicating a time-based on/off for an idle-state terminal, and wherein the information indicating the time-based on/off is broadcasted through system information of a base station.

9. The TSCTSF of claim 8, wherein the synchronization activation command includes condition information on a delivery of the management information, and wherein the condition information includes information for limiting a terminal to which third management information is delivered to a connected-state terminal.

10. The TSCTSF of claim 9, wherein the controller is further configured to control the communication unit to receive, from the PCF, a notification message notifying that the idle-state terminal has been changed to the connected-state terminal, and control the communication unit to transmit, to the PCF, a synchronization activation request, as a response to the notification message, wherein the third management information is transmitted to the connected-state terminal via the AMF from the PCF, based on the synchronization activation request, and wherein the third management information includes port management information for the DS-TT configuration of the connected-state terminal.

11. An access and mobility management function (AMF) in a communication system, the AMF comprising:

a communication unit; and a controller configured to:

control the communication unit to receive, from a time sensitive communication and time synchronization function (TSCTSF), management information associated with a device side-translator (DS-TT) configuration of a terminal, identify information indicating a time-based on/off for an idle-state terminal included in the management information, and control the communication unit to transmit, to a base station, the information indicating the time-based on/off, wherein the information indicating the time-based on/off is broadcasted through system information.

12. The AMF of claim 11, wherein the controller is further configured to control the communication unit to receive, from the idle-state terminal, a notification message notifying that the idle-state terminal has been changed to a connected-state terminal, control the communication unit to deliver, via a policy control function (PCF), the notification message to the TSCTSF, control the communication unit to receive, from the PCF, new management information as a response to the notification message, and control the communication unit to transmit, to the connected-state terminal, the new management information, and wherein the new management information includes port management information for the DS-TT configuration of the connected-state terminal.

13. A terminal in a communication system, the terminal comprising:

a communication unit; and a controller configured to:

control the communication unit to receive system information in an idle state, identify information indicating a time-based on/off included in the system information, and perform a synchronization operation based on the information indicating the time-based on/off, wherein management information associated with a device side-translator (DS-TT) configuration of the terminal is transmitted from a time sensitive communication and time synchronization function (TSCTSF) to an access and mobility management function (AMF), and wherein the management information includes the information indicating the time-based on/off for the terminal in the idle state.

14. The terminal of claim 13, wherein the controller is further configured to control the terminal to switch from the idle state to a connected state, control the communication unit to receive, from the AMF via a base station, new management information in case that the terminal switches to the connected state, and perform the synchronization operation based on the new management information, wherein the new management information is delivered from a policy control function (PCF) to the AMF based on the switching from the idle state to the connected state, and wherein the new management information includes port management information for the DS-TT configuration of the terminal switched to the connected state.

* * * * *